US012169877B2

(12) United States Patent
Hagland

(10) Patent No.: US 12,169,877 B2
(45) Date of Patent: Dec. 17, 2024

(54) CLIENT SIDE PROCESSING OF STREAMS OF VIDEO FRAMES GENERATED BY A SPLIT HIERARCHY GRAPHICS PROCESSING SYSTEM

(71) Applicant: Sony Interactive Entertainment LLC, San Mateo, CA (US)

(72) Inventor: Torgeir Hagland, Santa Ana, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 18/306,922

(22) Filed: Apr. 25, 2023

(65) Prior Publication Data
US 2023/0260073 A1  Aug. 17, 2023

Related U.S. Application Data

(63) Continuation of application No. 17/581,697, filed on Jan. 21, 2022, now Pat. No. 11,636,568, which is a (Continued)

(51) Int. Cl.
*G06T 1/20* (2006.01)
*A63F 13/24* (2014.01)
(Continued)

(52) U.S. Cl.
CPC ............... *G06T 1/20* (2013.01); *G06T 19/00* (2013.01); *H04L 67/10* (2013.01); *H04L 67/131* (2022.05);
(Continued)

(58) Field of Classification Search
CPC ......... G06T 1/20; G06T 19/00; G06T 15/005; G06T 19/006; H04L 67/10; H04L 67/131;
(Continued)

(56) References Cited

U.S. PATENT DOCUMENTS 9,454,847 B2    9/2016  Zhu
9,659,400 B2 *  5/2017  Urbach ................. G06F 3/1415
(Continued)

FOREIGN PATENT DOCUMENTS

CN    101197647 A    6/2008
CN    106780769 A    5/2017

OTHER PUBLICATIONS

JP Application No. 2023-073069, Office Action dated Aug. 8, 2023, Total 5 pages.
(Continued)

*Primary Examiner* — James A Thompson
*Assistant Examiner* — Kim Thanh T Tran
(74) *Attorney, Agent, or Firm* — PENILLA IP, APC

(57) ABSTRACT

A split hierarchy graphics processor system including a master node executing a virtual reality (VR) application responsive to input from a client device received over a network to generate primitives for in a VR environment. The graphics processor system including render nodes performing rendering based on the primitives for views into the VR environment taken from a location in the VR environment, the views corresponding to a grid map of the VR environment. Each of the render nodes renders, encodes and streams a corresponding sequence of frames of a corresponding view to the client device. The processor system including an asset library storing input geometries for the objects used for building the VR environment, wherein the objects in the asset library are accessible by the master node and the render nodes.

20 Claims, 11 Drawing Sheets

Related U.S. Application Data continuation of application No. 15/993,064, filed on May 30, 2018, now Pat. No. 11,232,532.

(51) Int. Cl.
  *A63F 13/32* (2014.01)
  *A63F 13/335* (2014.01)
  *G06T 19/00* (2011.01)
  *H04L 65/61* (2022.01)
  *H04L 67/10* (2022.01)
  *H04L 67/131* (2022.01)
  *H04L 69/16* (2022.01)

(52) U.S. Cl.
  CPC ............... *A63F 13/24* (2014.09); *A63F 13/32* (2014.09); *A63F 13/335* (2014.09); *A63F 2300/66* (2013.01); *A63F 2300/8082* (2013.01); *H04L 65/61* (2022.05); *H04L 69/16* (2013.01)

(58) Field of Classification Search
  CPC .......... H04L 65/61; H04L 69/16; A63F 13/32; A63F 2300/66; A63F 2300/8082; H04N 13/279; H04N 21/21805; H04N 21/8547
  See application file for complete search history.

(56) References Cited

U.S. PATENT DOCUMENTS

| | | | |
|---|---|---|---|
| 2003/0137956 A1* | 7/2003 | Salehi | H04B 1/7075 370/335 |
| 2008/0291279 A1 | 11/2008 | Samarasekera et al. | |
| 2015/0301708 A1* | 10/2015 | Kostello | G11B 27/031 715/723 |
| 2017/0280126 A1* | 9/2017 | Van der Auwera | G06T 3/08 |
| 2018/0098073 A1* | 4/2018 | Lawrence | H04N 19/176 |
| 2018/0103199 A1 | 4/2018 | Hendry et al. | |
| 2018/0242017 A1* | 8/2018 | Van Leuven | H04N 19/40 |
| 2019/0114830 A1* | 4/2019 | Bouazizi | G06F 3/013 |
| 2019/0213975 A1 | 7/2019 | Nakata et al. | |
| 2021/0409672 A1 | 12/2021 | Cole et al. | |

OTHER PUBLICATIONS

CN Application No. 2022052602512650, Office Action dated May 31, 2022, Total pages.

* cited by examiner

CLIENT SIDE PROCESSING OF STREAMS OF VIDEO FRAMES GENERATED BY A SPLIT HIERARCHY GRAPHICS PROCESSING SYSTEM

CLAIM OF PRIORITY

The present application is a continuation of and claims priority to and the benefit of the commonly owned patent application, U.S. Ser. No. 17/581,697, filed on Jan. 21, 2022, entitled "SPLIT HIERARCHY GRAPHICS PROCESSING SYSTEM,"; which is a continuation of and claims priority to and the benefit of the commonly owned patent application, U.S. Ser. No. 15/993,064, filed on May 30, 2018, entitled "MULTI-SERVER CLOUD VIRTUAL REALITY (VR) STREAMING," all of which are herein incorporated by reference in their entireties for all purposes.

TECHNICAL FIELD

The present disclosure is related to computer generated images, and more specifically to real-time rendering of computer generated graphics.

BACKGROUND OF THE DISCLOSURE

Computer rendering of virtual reality (VR) scenes in a rendering pipeline requires central processing unit (CPU) and graphic processing unit (GPU) resources. A VR scene may be rendered over a wide viewing range, though only a smaller portion of that viewing range is displayed. In addition, VR scenes may be more complex than traditional scenes, and also may require a higher frame rate for image processing to avoid motion sickness by the user.

A VR scene may be generated for example as a cube map which is used to project the VR scene from a given location onto the sides of a cube. The cube surrounds the location from which the views are generated. Specifically, each side of the cube map is generated by rendering the VR scene for the corresponding view for that location in the VR environment. A cube map viewer will blend one or more views for a given viewpoint into the VR environment.

Typically, a single computing resource including both the CPU and the GPU are used to perform the rendering of views for the cube map. However, the computing resource may be incapable of processing VR scenes without incurring motion sickness in the user without implementing some cost saving measures in terms of processing power. For example, views of a cube map that are not used to generate a user's viewpoint into the VR environment may be generated at lower resolution than those views that are used to generate the viewpoint. That is, if the user is viewing between the ranges of 280-40 degrees (forward) into a VR environment (e.g., corresponding to a location of a character), then the cube map views corresponding to 180 degrees (backwards) are rendered at low resolution. However, when the user physically turns his head to view other areas of the VR environment (e.g., rotate backwards towards 180 degrees), the views being shown on the head mounted display (HMD) are generated from low resolution images. In that case, the user may be highly susceptible to motion sickness when going from high resolution to lower resolution views.

It is in this context that embodiments of the disclosure arise.

SUMMARY

Embodiments of the present disclosure relate to a split hierarchy graphics processor system implemented in a cloud system for performing multi-server cloud VR streaming of VR content. For example, the split hierarchy graphics process system is configured to perform streaming of VR content as implemented through the generation of each side of a grid map on a separate render node/server, wherein the render nodes are controlled by a master node performing application logic (e.g., executing a gaming application). Several inventive embodiments of the present disclosure are described below.

In one embodiment, a split hierarchy graphics processor system implemented in a cloud system includes a master node executing a virtual reality (VR) application responsive to input from a client device of a user received over a network to generate a plurality of primitives for a plurality of objects in a VR environment. The graphics processor system includes a plurality of render nodes performing rendering based on the plurality of primitives for a plurality of views into the VR environment taken from a location in the VR environment, the plurality of views corresponding to a grid map of the VR environment, wherein each of the render nodes renders, encodes and streams a corresponding sequence of frames of a corresponding view to the client device. The graphics processor system includes an asset library storing input geometries for the plurality of objects used for building the VR environment, wherein the plurality of objects in the asset library are accessible by the master node and the plurality of render nodes In one embodiment, a method for performing graphics processing using a split hierarchy graphics processor system of a cloud system is disclosed. The method including executing at a master node of a cloud system a VR application responsive to input from a client device of a user to generate a plurality of primitives for a plurality of objects in a VR environment of the VR application. The method including rendering a plurality of sequences of frames at a plurality of render nodes based on the plurality of primitives for a plurality of views into the VR environment taken from a location in the VR environment, the plurality of views corresponding to a grid map of the VR environment, wherein a corresponding sequence of frames is associated with a corresponding view. The method including storing input geometries for the plurality of objects in an asset library, the plurality of objects used for building the VR environment, wherein the plurality of objects in the asset library are accessible by the master node and the plurality of render nodes. The method includes encoding at each render node a corresponding sequence of frames. The method including streaming from each render node a corresponding sequence of frames to the client device.

In another embodiment, a non-transitory computer-readable medium storing a computer program for performing graphics processing using a split hierarchy graphics processor system of a cloud system. The computer-readable medium including program instructions for executing at a master node of a cloud system a VR application responsive to input from a client device of a user to generate a plurality of primitives for a plurality of objects in a VR environment of the VR application. The computer-readable medium including program instructions for rendering a plurality of sequences of frames at a plurality of render nodes based on the plurality of primitives for a plurality of views into the VR environment taken from a location in the VR environment, the plurality of views corresponding to a grid map of the VR environment, wherein a corresponding sequence of frames is associated with a corresponding view. The computer-readable medium including program instructions for storing input geometries for the plurality of objects in an asset library, the plurality of objects used for building the VR environment, wherein the plurality of objects in the asset library are accessible by the master node and the plurality of render nodes. The computer-readable medium including program instructions for encoding at each render node a corresponding sequence of frames. The computer-readable medium including program instructions for streaming from each render node a corresponding sequence of frames.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1A:
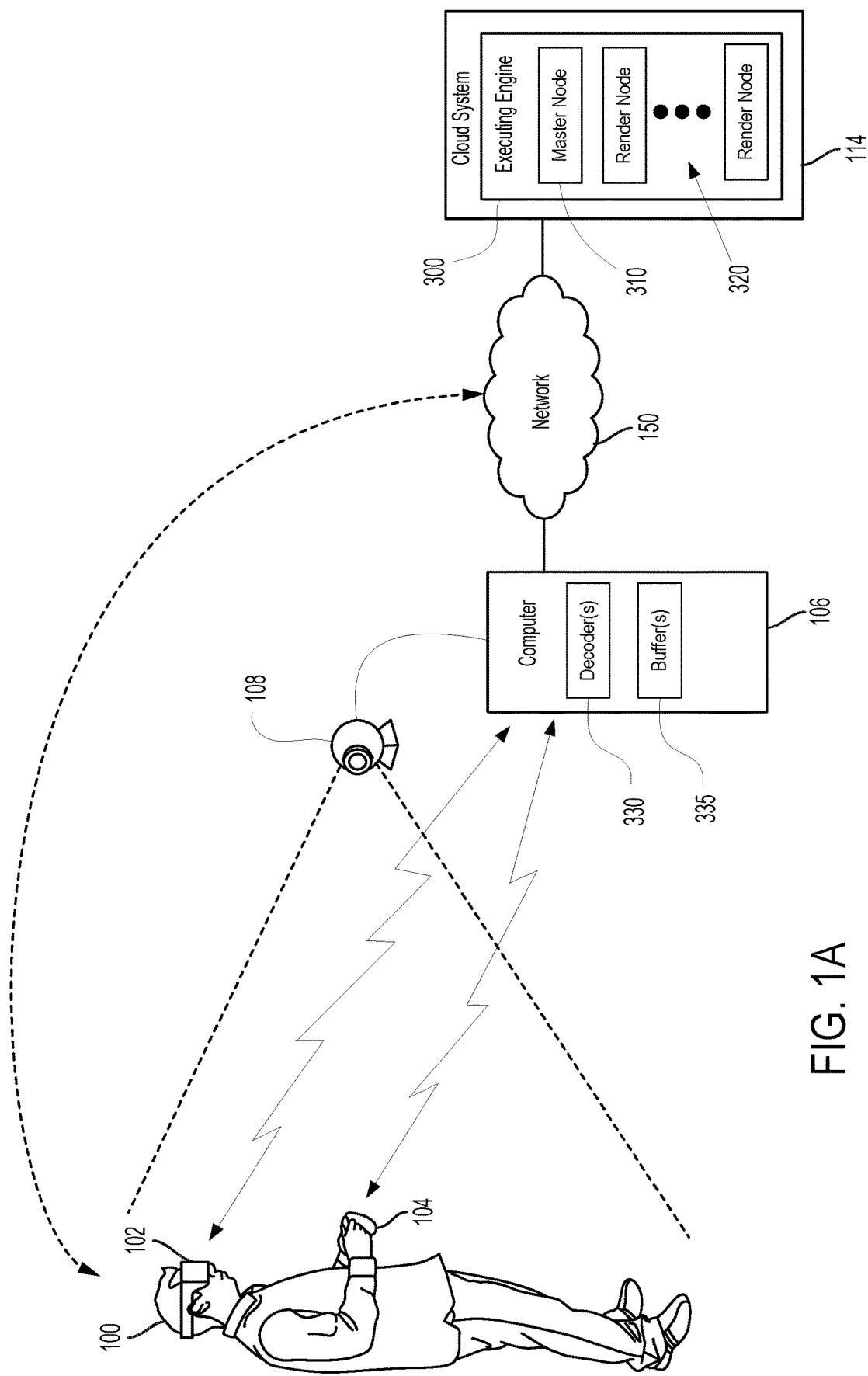
FIG. 1A illustrates a system configured for providing an interactive experience with VR content that is generated using multiple servers and/or compute nodes of a cloud system, wherein some input control may be provided through a handheld controller, and some input control may be managed through tracking of body parts as implemented through a camera, in accordance with one embodiment of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods for a split hierarchy graphics processor system implemented in a cloud system for performing multi-server cloud VR streaming of VR content. For example, the split hierarchy graphics process system is configured to perform streaming of VR content as implemented through the generation of each side of a grid map on a separate render node/server. In particular, the split hierarchy graphics processor system includes multiple servers/compute nodes on the cloud system. For example, a master node is configured to run game logic. The master node also may synchronize the operations of the plurality of render nodes (e.g., through synchronization packets), each of which renders video frames for a corresponding view of the grid map. In one implementation, the master node and the render nodes are placed into a server rack for communication purposes. In addition, synchronization is inherent between the render nodes because the multi-server system is implemented in one rack. Traditional VR systems need to sacrifice resolution quality in order to process all angles of a VR scene (e.g., rendering unviewed sides of a grid map with lower resolution) because the processing power is limited to a single hardware system performing all of the graphics processing and/or rendering. That is, as the user rotates an HMD in space using a traditional system the display is showing views that switch between low and high resolutions thereby inducing motion sickness in the user. On the other hand, embodiments of the present disclosure provide for the generation of views of each side of a grid map at the highest resolution no matter which views are used to generate a current viewpoint into the VR environment of a user. That is, embodiments of the present disclosure may grant additional CPU and/or GPU resources to an execution engine (e.g., executing a gaming and/or interactive VR application) at a cloud system due to the split architecture implementing the graphics pipeline. With the increased CPU and/or GPU resources providing at least for rendering at the highest resolution of all the views corresponding to sides of the grid map, one advantage includes reducing motion sickness of the user. For example, the images presented to the user remain at high resolution, especially as the user rotates the HMD in space to view different views of the VR environment, such that there is no switching between views of low resolution and high resolution. Several inventive embodiments of the present disclosure are described below.

With the above general understanding of the various embodiments, example details of the embodiments will now be described with reference to the various drawings.

Throughout the specification, the reference to "gaming application" is meant to represent any type of interactive application that is directed through execution of input commands. For illustration purposes only, an interactive application includes applications for gaming, word processing, video processing, video game processing, etc. Further, the terms video game and gaming application are interchangeable.

FIG. 1A illustrates a system for providing user interaction with a VR scene or environment (e.g., interactive gameplay of a gaming application), in accordance with an embodiment of the disclosure. A user 100 is shown wearing an HMD 102, wherein the HMD 102 is worn in a manner similar to glasses, goggles, or a helmet, and is configured to display a video game from an interactive gaming application or other content from interactive application, to the user 100. The HMD 102 provides a very immersive experience to the user by virtue of its provision of display mechanisms in close proximity to the user's eyes. Thus, the HMD 102 can provide display regions to each of the user's eyes which occupy large portions or even the entirety of the field of view of the user.

In one embodiment, the HMD 102 can be connected to a computer or gaming console 106. The connection to computer 106 can be wired or wireless. In some implementations, the HMD 102 may also communicate with the computer through alternative mechanisms or channels, such as via network 112 to which both HMD 102 and the computer 106 are connected. The computer 106 can be any general or special purpose computer known in the art, including but not limited to, a gaming console, personal computer, laptop, tablet computer, mobile device, cellular phone, tablet, thin client, set-top box, media streaming device, etc. In one embodiment, the computer 106 can be configured to execute a gaming application and/or interactive VR application, and output the video and audio from the gaming or VR application for rendering by the HMD 102. The computer 106 is not restricted to executing a gaming application but may also be configured to execute an interactive application, which outputs VR content 191 for rendering by the HMD 102.

In another embodiment, the computer 106 functions as a thin client in communication over a network with a cloud system 114, or back-end server system. In that manner, the cloud system 114 maintains and executes the gaming application and/or interactive VR application being played by the user 102. The local computer 106 transmits inputs from the HMD 102, the controller 104 and the camera 108, to the cloud system 114, which processes the inputs to affect the game state of the executing gaming and/or VR application. The output from the executing application, such as video data, audio data, and haptic feedback data, is transmitted to the computer 106. The computer 106 may further process the data before transmission or may directly transmit the data to the relevant devices. For example, video and audio streams are provided to the HMD 102, whereas the haptic feedback data is used to generate a vibration feedback command, which is provided to the controller 104.

In one embodiment, the cloud system is configured to implement a split hierarchy graphics processor system for performing multi-server cloud VR streaming of VR content. For example, the cloud system 114 includes an executing engine 300 (e.g., gaming engine) that includes a master node 310 and a plurality of render nodes 320. The master node 310 is configured to perform CPU functions when executing the gaming and/or interactive VR application, such as performing simulation, running scripts, and providing the necessary input (e.g., primitives) to the graphics engine for performing rendering. The master node 310 may also perform synchronization of the render nodes. The plurality of render nodes 320 is configured to perform rendering of frames for each side of a grid map. For example, for a cube map with six sides, six render nodes are used to generate views for each of the sides of the cube map, wherein each render node generates image and/or video frames for a corresponding view of the cube map.

The user 100 may operate a controller 104 to provide input for the gaming and/or interactive VR application. The connection to computer 106 can be wired or wireless. Additionally, a camera 108 can be configured to capture one or more images of the interactive environment in which the user 100 is located. These captured images can be analyzed to determine the location and movements of the user 100, parts of the user (e.g., tracking hand gestures for input commands), the HMD 102, and the controller 104. In one embodiment, the controller 104 includes a light or other marker elements which can be tracked to determine its location and orientation. Additionally, HMD 102 may include one or more lights which can be tracked to determine the location and orientation of the HMD 102. The tracking functionality as implemented in part by camera 108 provides for input commands generated through movement of the controller 104 and/or body parts (e.g., hand) of the user 100. The camera 108 can include one or more microphones to capture sound from the interactive environment. Sound captured by a microphone array may be processed to identify the location of a sound source. Sound from an identified location can be selectively utilized or processed to the exclusion of other sounds not from the identified location. Furthermore, the camera 108 can be defined to include multiple image capture devices (e.g. stereoscopic pair of cameras), an IR camera, a depth camera, and combinations thereof.

In one embodiment, the HMD 102, controller 104, and camera 108, may themselves be networked devices that connect to the network 150 to communicate with the cloud system 114. For example, the computer 106 may be a local network device, such as a router, that does not otherwise perform video game processing, but facilitates passage network traffic. The connections to the network by the HMD 102, controller 104, and camera (i.e., image capture device) 108 may be wired or wireless.

In yet another embodiment, the computer 106 may execute a portion of the gaming application, while the remaining portion of the gaming application may be executed on a cloud system 114. In other embodiments, portions of the gaming application may also be executed on HMD 102. For example, a request for downloading the gaming and/or interactive VR application from the computer 106 may be serviced by the cloud system 114. While the request is being serviced, the cloud system 114 may execute a portion of the gaming and or interactive VR application and provide game content to the computer 106 for rendering on the HMD 102. The computer 106 may communicate with the cloud system 114 over a network 150. Inputs received from the HMD 102, the controller 104 and the camera 108, are transmitted to the cloud system 114, while the gaming application is downloading on to the computer 106. The cloud system 114 processes the inputs to affect the game state of the executing gaming and/or interactive VR application. The output from the executing gaming and/or interactive VR application, such as video data, audio data, and haptic feedback data, is transmitted to the computer 106 for onward transmission to the respective devices.

Once the gaming and/or interactive VR application has been completely downloaded to the computer 106, the computer 106 may execute the gaming and/or interactive VR application and resume game play of the gaming and/or interactive VR application from where it was left off on the cloud system 114. The inputs from the HMD 102, the controller 104, and the camera 108 are processed by the computer 106, and the game state of the gaming application is adjusted, in response to the inputs received from the HMD 102, the controller 104, and the camera 108. In such embodiments, a game state of the gaming and/or interactive VR application at the computer 106 is synchronized with the game state at the cloud system 114. The synchronization may be done periodically to keep the state of the gaming and/or interactive VR application current at both the computer 106 and the cloud system 114. The computer 106 may directly transmit the output data to the relevant devices. For example, video and audio streams are provided to the HMD 102, whereas the haptic feedback data is used to generate a vibration feedback command, which is provided to the controller 104.

Figure 1B:
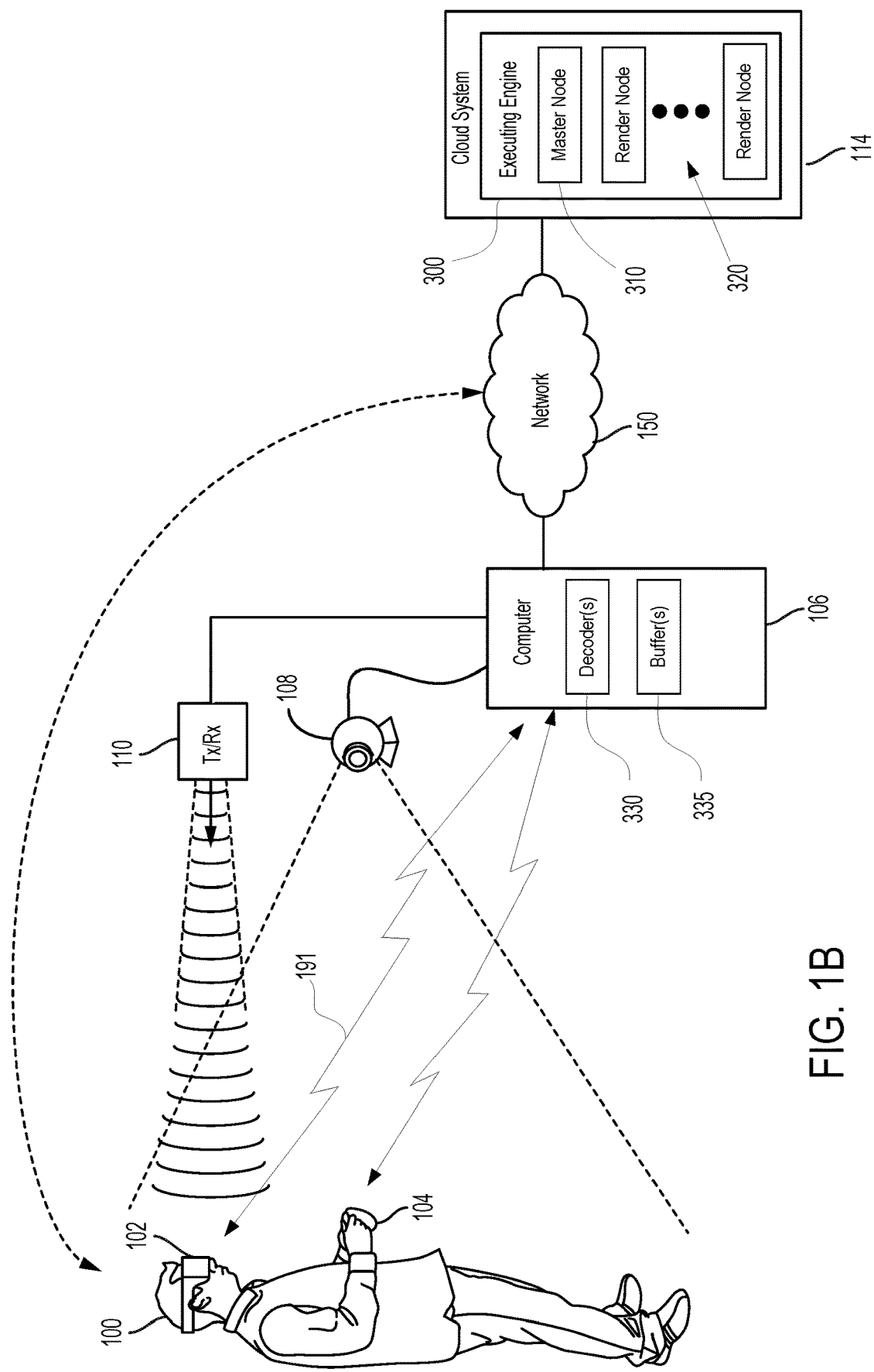
FIG. 1B illustrates a system configured for providing an interactive experience with VR content that is generated using multiple servers and/or compute nodes of a cloud system, wherein some input control for editing may be provided through a handheld controller, and some input control may be managed through tracking of body parts as implemented through a camera, wherein the camera also tracks movement of the HMD for purposes of beam tracking of an RF emitter transmitting data to the HMD, in accordance with one embodiment of the present disclosure.

FIG. 1B illustrates a system configured for providing an interactive experience with VR content, wherein the VR content is generated using a split hierarchy graphics processor system for performing multi-server cloud VR streaming of the VR content, in accordance with one embodiment of the present disclosure. In particular, the system (e.g., HMD 102, computer 106, and/or cloud 114) is configured for performing multi-server cloud VR streaming of VR content. As previously described, the cloud system 114 includes an executing engine 300 (e.g., gaming engine) that includes a master node 310 (e.g., performing simulation, game logic, running scripts, generating primitives, performing synchronization, etc.) and a plurality of render nodes 320, each of which is configured to render frames (to generate views) for a corresponding side of a grid map. FIG. 1B is similar to the system described in FIG. 1A, with the addition of the transmitter/receiver (transceiver) 110 that is configured for data delivery to the HMD 102 via RF signals, for example. The transceiver 110 is configured to transmit (by wired connection or wireless connection) the video and audio from the gaming application to the HMD 102 for rendering thereon. In one embodiment, the transceiver 110 is configured for beam forming or beam steering for purposes of optimizing data throughput (e.g., efficient transmission of information). In addition, the transceiver 110 is configured to transmit images, video, and audio of 3D digital content. In this implementation, optional camera 108 may be configured to track movement of the HMD 102, such that the transceiver 110 may beam steer the majority of its RF power (as delivered through an RF radiation pattern) to the HMD 102 (e.g., for purpose of delivering data), in accordance with one embodiment of the present disclosure. That is, once the position of the HMD is known in space and in relation to the transceiver 110, that information is fed back to the transceiver such that the transceiver is able to direct the majority of its transmission power (e.g., beam steer) in the direction of the HMD 102. HMD 102 is also configured for communicating with the computer 106 through a side or secondary channel 191, either through wired or wireless (e.g., Bluetooth, Wi-Fi, etc.) communication paths to pass information to and from the HMD 102.

Figure 1C:
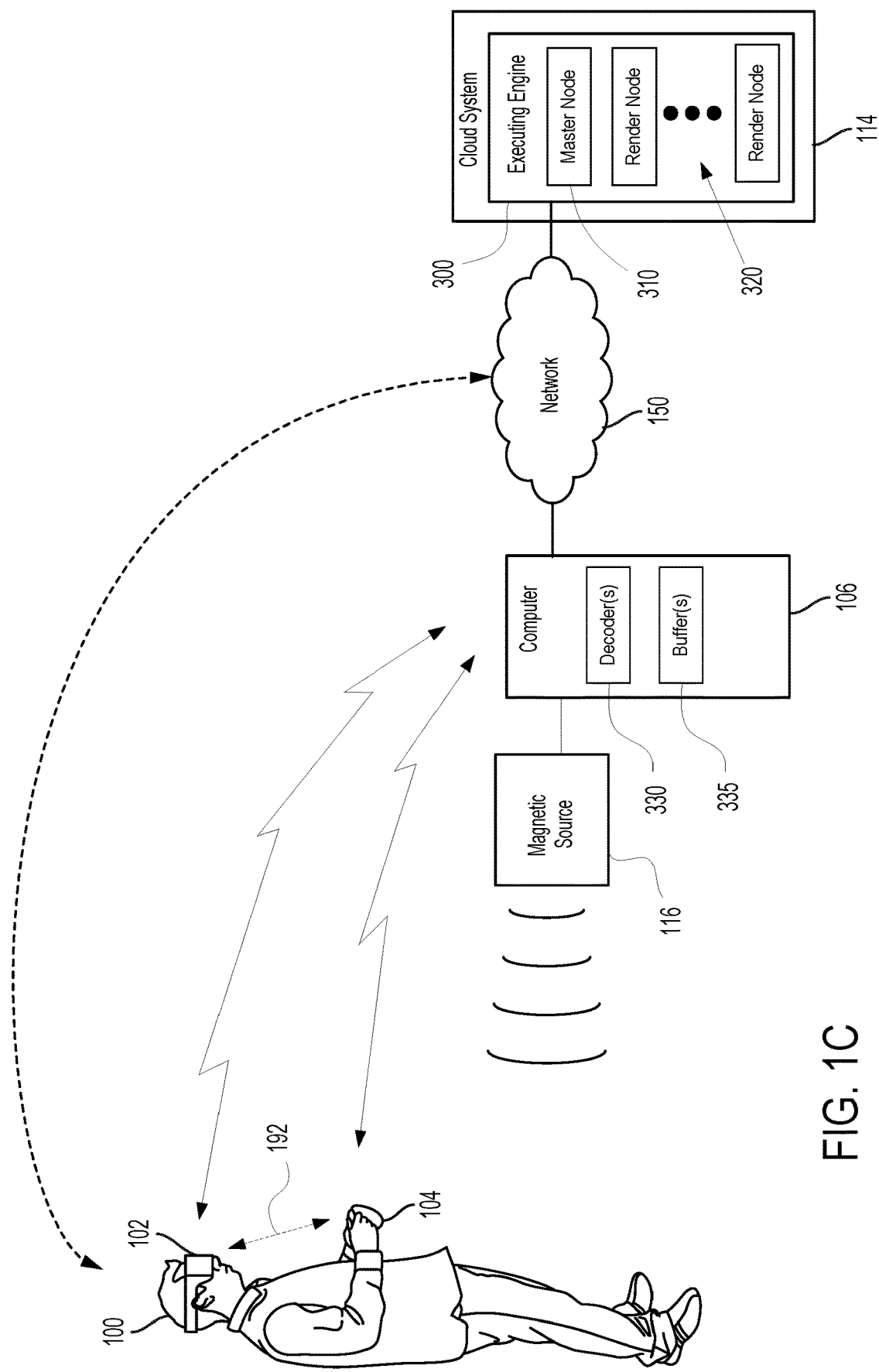
FIG. 1C illustrates a system configured for providing an interactive experience with VR content that is generated using multiple servers and/or compute nodes of a cloud system, wherein some input control for editing may be provided through a handheld controller, and some input control may be managed through the magnetic tracking of body parts as implemented in part through a magnetic source, in accordance with one embodiment of the present disclosure.

FIG. 1C illustrates a system configured for providing an interactive experience with VR content, wherein the VR content is generated using a split hierarchy graphics processor system for performing multi-server cloud VR streaming of the VR content, in accordance with one embodiment of the present disclosure. In particular, the system (e.g., HMD 102, computer 106, and/or cloud 114) is configured for performing multi-server cloud VR streaming of VR content. As previously described, the cloud system 114 includes an executing engine 300 (e.g., gaming engine) that includes a master node 310 (e.g., performing simulation, game logic, running scripts, generating primitives, performing synchronization, etc.) and a plurality of render nodes 320, each of which is configured to render frames (to generate views) for a corresponding side of a grid map. FIG. 1C is similar to the system described in FIG. 1A, with the addition of the magnetic source 116 configured to emit a magnetic field to enable magnetic tracking of the HMD 102, controller 104 (e.g., configured as an interface controller), or any object configured with magnetic sensors/antennas (e.g., gloves, strips located on body parts—such as fingers, etc.). For example, the magnetic sensors could be inductive elements. In particular, the magnetic sensors can be configured to detect the magnetic field (e.g., strength, orientation) as emitted by the magnetic source 116. The information gathered from the magnetic sensors can be used to determine and track the location and/or orientation of the HMD 102, controller 104, and other interface objects, etc., such as in order to provide input commands. In embodiments, the magnetic tracking is combined with tracking performed through the camera 108 and/or inertial sensors within the HMD 102, controller 104 and/or other interface objects.

In some implementations, the interface object (e.g., controller 104) is tracked relative to the HMD 102. For example, the HMD 102 may include an externally facing camera that captured images including the interface object. In other embodiments, HMD 102 may include an IR emitter used for tracking external objects, such as the interface object. That is, HMD 102 is configured to independently track controller 104 through signals 192 (e.g., IR emitter, magnetic sensors, etc.) to determine relative position of the interface object (e.g., controller 104) to the HMD 102. For example, the captured images may be analyzed to determine the location/orientation of the interface object relate to the HMD 102, and using a known location/orientation of the HMD 102, so as to determine the location/orientation and/or movement of the interface object in the local environment.

The way the user 100 interfaces with the virtual reality scene of a gaming application, or of the interactive VR environment, displayed in the HMD 102 can vary, and other interface devices in addition to the interface object (e.g., controller 104), can be used. For instance, various kinds of single-handed, as well as two-handed controllers 104 can be used. In some implementations, the controllers 104 themselves can be tracked by tracking lights included in the controllers, or tracking of shapes, sensors, and inertial data associated with the controllers 104. Using these various types of controllers 104, or even simply hand gestures that are made and captured by one or more cameras, and magnetic sensors, it is possible to interface, control, maneuver, interact with, and participate in the virtual reality gaming environment presented on the HMD 102.

Figure 2:
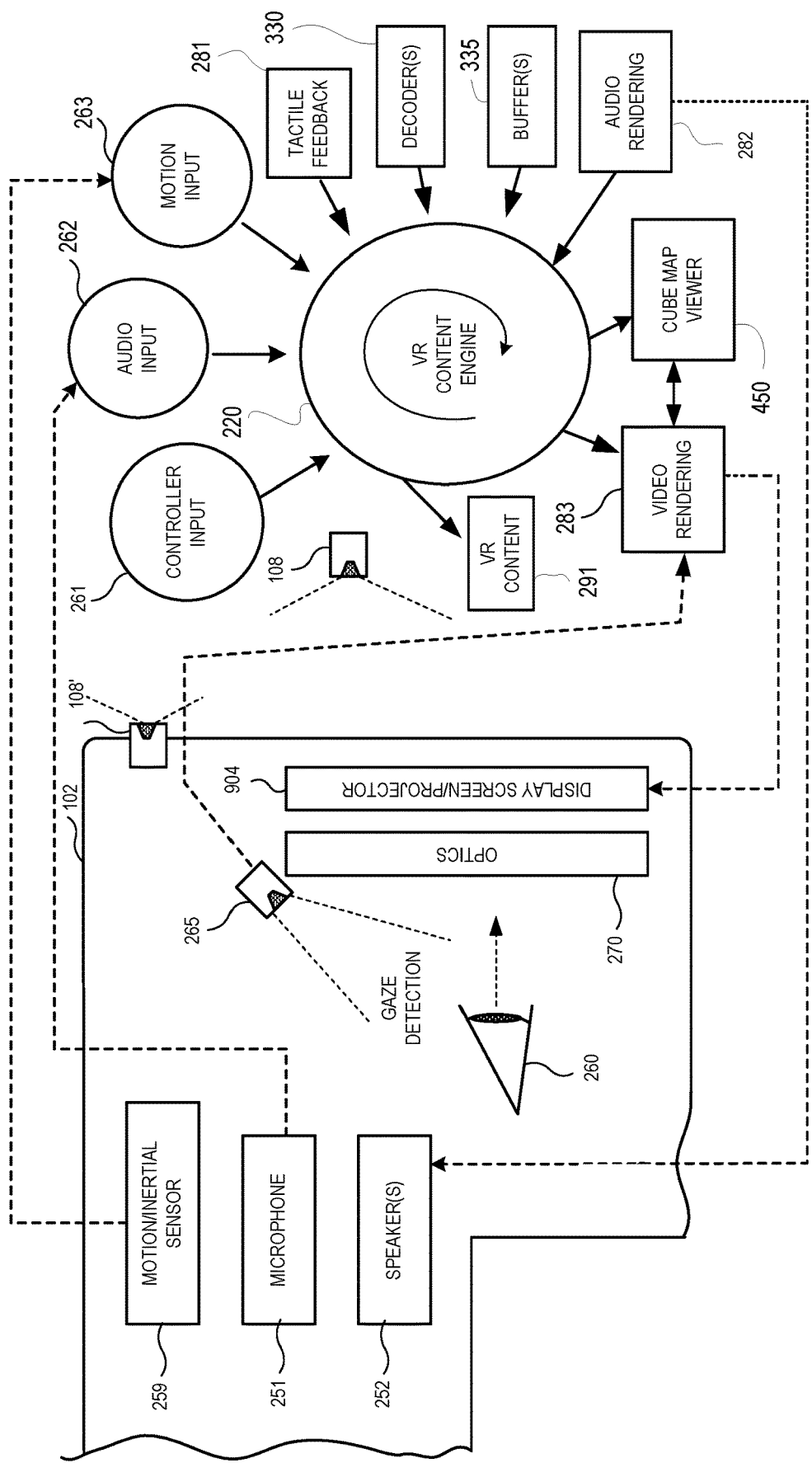
FIG. 2 conceptually illustrates the function of a HMD in conjunction with executing video game and for displaying VR content that is generated using multiple servers and/or compute nodes of a cloud system, in accordance with an embodiment of the disclosure.

FIG. 2 conceptually illustrates the function of a HMD 102 in conjunction with the display of VR content 291, wherein the VR content is generated at a back-end cloud system delivering the VR content over a network. The VR content may be generated from a gaming application and/or an interactive VR application, for example. In particular, the cloud system may include a split hierarchy graphics processor system for performing multi-server cloud VR streaming of the VR content to the HMD 102 and/or a local computer 106 for display on the HMD 102. For example, the cloud system may include an executing engine (e.g., gaming engine) that includes a master node (e.g., performing simulation, game logic, running scripts, generating primitives, performing synchronization, etc.) and a plurality of render nodes, each of which is configured to render frames (to generate views) for a corresponding side of a grid map.

In some embodiments, the HMD 102 can be configured to independently generate VR content. In other embodiments, the VR content engine 220 is being executed on a computer 106 (not shown) that is communicatively coupled to the HMD 102, and/or in combination with the HMD 102. The computer may be local to the HMD (e.g., part of local area network) or may be remotely located (e.g., part of a wide area network, a cloud network, etc.) and accessed via a network. The communication between the HMD 102 and the computer 106 may follow a wired or a wireless connection protocol.

In an example, the VR content engine 220 executing an application may be a video game engine executing a gaming application and/or an interactive VR application, and is configured to receive inputs to update a game state of the gaming application. The following description of FIG. 2 is described within the context of the VR content engine 220 executing a gaming and/or interactive VR application, for purposes of brevity and clarity, and is intended to represent the execution of any application capable of generating VR content 291. As previously described, the VR content engine can be implemented at the back-end cloud system, on the local gaming console, on the HMD 102 itself, or any combination thereof. The game state of the gaming application can be defined, at least in part, by values of various parameters of the video game which define various aspects of the current gameplay, such as the presence and location of objects, the conditions of a virtual environment, the triggering of events, user profiles, view perspectives, etc.

In the illustrated embodiment, the VR content engine 220 receives, by way of example, controller input 261, audio input 262 and motion input 263. The controller input 261 may be defined from the operation of a gaming controller separate from the HMD 102, such as a hand-held gaming controller 104 (e.g. Sony DUALSHOCK®4 wireless controller, Sony PlayStation® Move motion controller) or wearable controllers, such as wearable glove interface controller, etc. By way of example, controller input 261 may include directional inputs, button presses, trigger activation, movements, gestures or other kinds of inputs processed from the operation of a gaming controller. The audio input 262 can be processed from a microphone 251 of the HMD 102, or from a microphone included in the image capture device 208 or elsewhere within the local system environment. The motion input 263 can be processed from a motion sensor 259 included in the HMD 102, or from image capture device 108 as it captures images of the HMD 102. For example, in the case of executing a gaming application, the VR content engine 220 receives inputs which are processed according to the configuration of the content engine 220 operating as a game engine to update the game state of the video game. The engine 220 outputs game state data to various rendering modules which process the game state data to define content which will be presented to the user.

In the illustrated embodiment, a video rendering module 283 is defined to render a video stream for presentation on the HMD 102. For example, the video rendering may perform the functions of a graphics pipeline. Components and/or functions of the video rendering 283 may be performed within a CPU or GPU, or combination thereof.

In one embodiment, the one or more decoders 330 are configured to receive encoded frames that are rendered by the cloud system (e.g., back-end gaming and/or interactive VR application server). Decoders 330 are configured to decode the encoded frames back to their original and/or raw state, or some similar state. Previously the frames were encoded (apply compression) for efficient transmission over a network (e.g., internet), wherein a stream of encoded frames is generated for each side of a grid map (e.g., a cube map with six sides). Each of the decoders decodes frames that were generated for a corresponding side of the grid map. After decoding, the decoded frames are stored in one or more buffers 335. For example, each stream of decoded frames corresponding to a side of the grid map may be stored in a corresponding buffer. Or multiple streams corresponding to multiple sides of the grid map may be stored in one buffer, wherein each stream can be independently accessed from the buffer. The cube map viewer 450 is configured to blend one or more of the views from the grid map (e.g., one or more sides of the grid map) to generate a current point-of-view of a user into an VR scene.

A lens of optics 270 in the HMD 102 is configured for viewing the VR content 291. A display screen 1304 is disposed behind the lens of optics 270, such that the lens of optics 270 is between the display screen 1304 and an eye 260 of the user, when the HMD 102 is worn by the user. In that manner, the video stream may be presented by the display screen/projector mechanism 1304, and viewed through optics 270 by the eye 260 of the user. An HMD user may elect to interact with the interactive VR content 291 (e.g., VR video source, video game content, etc.) by wearing the HMD. Interactive virtual reality (VR) scenes from a video game may be rendered on the display screen 1304 of the HMD. In that manner, during game development the HMD 102 allows the user to edit and review the interactive VR scenes. Also, during game play (to include reviewing edits) the HMD allows the user to completely immerse in the game play by provisioning display mechanism of the HMD in close proximity to the user's eyes. The display regions defined in the display screen of the HMD for rendering content may occupy large portions or even the entirety of the field of view of the user. Typically, each eye is supported by an associated lens of optics 270 which is viewing one or more display screens.

An audio rendering module 282 is configured to render an audio stream for listening by the user. In one embodiment, the audio stream is output through a speaker 152 associated with the HMD 102. It should be appreciated that speaker 152 may take the form of an open air speaker, headphones, or any other kind of speaker capable of presenting audio.

In one embodiment, a gaze tracking sensor 265 is included in the HMD 102 to enable tracking of the gaze of the user. Although only one gaze tracking sensor 265 is included, it should be noted that more than one gaze tracking sensors may be employed to track the gaze of the user. Gaze tracking sensor 265 may be one or more of a camera, an optical sensor, an infrared sensor, an EMG (electromyography) sensor, an optical reflector sensor, a range sensor, and optical flow senor, a Doppler sensor, a microphone, and the like. Generally, sensor 265 may be configured to detect rapid eye movements such as a change in eye movement direction, acceleration, and speed. For example, a gaze tracking camera captures images of the user's eyes, which are analyzed to determine the gaze direction of the user. In one embodiment, information about the gaze direction of the user can be utilized to affect the video rendering. For example, if a user's eyes are determined to be looking in a specific direction, then the video rendering for that direction can be prioritized or emphasized. It should be appreciated that the gaze direction of the user can be defined relative to the head mounted display, relative to a real environment in which the user is situated, and/or relative to a virtual environment that is being rendered on the head mounted display. Since the gaze direction may be defined relative to the screen of the HMD, the gaze direction may be converted to a location on the screen.

Broadly speaking, analysis of images captured by the gaze tracking sensor 265, when considered alone, provides for a gaze direction of the user relative to the HMD 102. However, when considered in combination with the tracked location and orientation of the HMD 102, a real-world gaze direction of the user may also be determined, as the location and orientation of the HMD 102 is synonymous with the location and orientation of the user's head. That is, the real-world gaze direction of the user can be determined from tracking the positional movements of the user's eyes and tracking the location and orientation of the HMD 102. When a view of a virtual environment is rendered on the HMD 102, the real-world gaze direction of the user can be applied to determine a virtual world gaze direction of the user in the virtual environment.

Additionally, a tactile feedback module 281 is configured to provide signals to tactile feedback hardware included in either the HMD 102 or another device operated by the HMD user, such as a controller 104. The tactile feedback may take the form of various kinds of tactile sensations, such as vibration feedback, temperature feedback, pressure feedback, etc.

Figure 3:
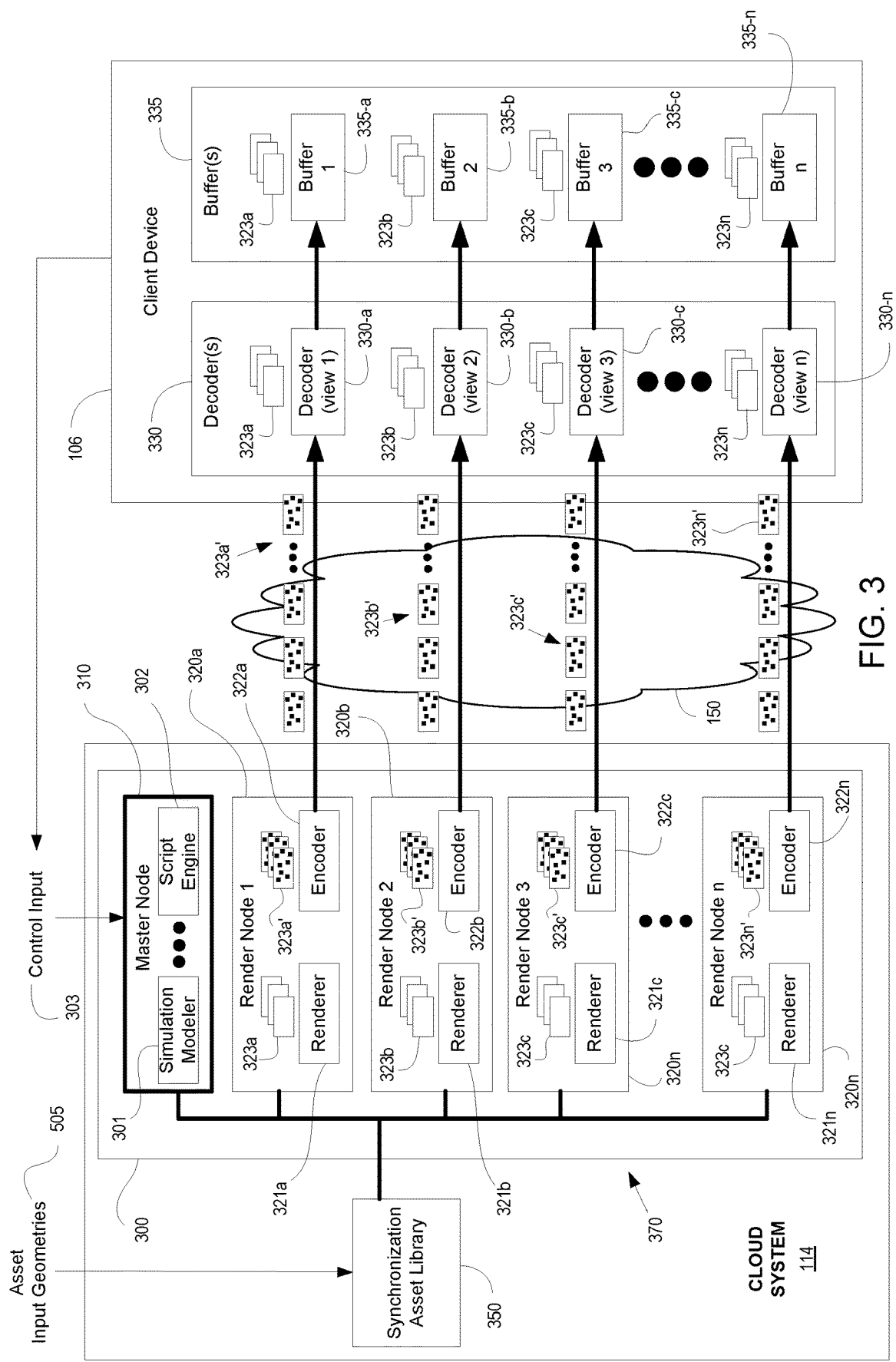
FIG. 3 is a data flow diagram illustrating the generation of VR content at a cloud system using multiple servers and/or compute nodes of a cloud system to implement a split hierarchy graphics processor system, in accordance with one embodiment of the present disclosure.

FIG. 3 is a data flow diagram illustrating the generation of VR content at a cloud system using multiple servers and/or compute nodes of a cloud system 114 to implement a split hierarchy graphics processor system, in accordance with one embodiment of the present disclosure. In general, the cloud system 114 executes a gaming application and/or VR interactive application to include rendering and encoding frames for each of the multiple sides of a grid map, wherein each side corresponds to a view into a VR environment for a given location. The encoded frames are streamed over a network 150 to a client device 106 for decoding, blending, and displaying.

The cloud system 114 includes the split hierarchy graphics processor system configured for performing multi-server cloud VR streaming of VR content. In particular, the split hierarchy graphics processor system includes multiple servers/compute nodes on the cloud system 114, such as the master node 310 and the plurality of render nodes 320.

The master node is configured to execute the gaming application and/or interactive VR application, such as running the game logic, application logic, executing scripts in the application, performing simulation of the objects provided in the VR environment/world of the VR application. For example, the master node may include a simulation modeler 301 that is configured for performing simulation of the objects. For example, the master node may include a physics simulation modeler that is configured for applying a simulation of natural or defined laws of physics (e.g., natural or game specific laws, rules, scripts, etc.) against the objects for a given set of input data. In addition, the master node 310 may include a script engine 302 for executing scripts provided in the application (e.g., scripts applying laws of physics, applying gaming laws of physics for a particular fictionalized world, etc.). In general, the master node 310 is configured for performing the CPU functions of a graphics pipeline, as will be described below in relation to FIG. 5. For example, the master node is configured to execute an interactive VR application responsive to input (e.g., control input 303) from a client device 106 of a user received over a network 150 to generate a plurality of primitives (not shown) for a plurality of objects in a VR environment/scene of the VR application.

In particular, the cloud system 114 includes a plurality of render nodes 320 configured for performing rendering based on the plurality of primitives for a plurality of views into the VR environment taken from a location in the VR environment. For example, each render node is configured for performing render operations, such as rasterization, fragment shading, output merging, frame buffering, etc. to create a sequence of video frames for streaming to a client device.

Further, the split hierarchy graphics processor system includes an asset library 350 configured for storing input geometries 505 for the plurality of objects used for building the VR environment. The objects as represented by corresponding input geometries are accessible by the master node 310 and the plurality of render nodes 320. In particular, the master node generates primitives for the objects based on the input geometries and control input 303. Each of the render nodes performs rendering of the objects (as represented by the input geometries) based on the output from the master node (e.g., motion of an object after application of physics simulation).

Because the split hierarchy, each of the sequences of video frames for the views are rendered at the highest resolution (e.g., full resolution). The plurality of views corresponds to a grid map of the VR environment for that location. In one embodiment, each of the render nodes renders video frames for a corresponding view of the grid map. For example, render node 1 (320*a*) includes a renderer 321*a* configured to generate a sequence of video frames 323*a* for a corresponding view of a grid map. Similarly, render node 2 (320*b*) includes a renderer 321*b* configured to generate a sequence of video frames 323*b* for a corresponding view of a grid map; render node 3 (320*c*) includes a renderer 321*c* configured to generate a sequence of video frames 323*c* for a corresponding view of a grid map . . . and render node n (320*n*) includes a renderer 321*n* configured to generate a sequence of video frames 323*n* for a corresponding view of a grid map.

Further, each of the plurality of render nodes 320 encodes its corresponding stream of frames. In general, encoding is performed to compress the sequence of video frames for communication efficiency as it is being streamed through the network 150. For example, render node 1 (320*a*) includes encoder 322*a* configured to generate a sequence of encoded frames 323*a*'; render node 2 (320*b*) includes encoder 322*b* configured to generate a sequence of encoded frames 323*b*'; render node 3 (320*c*) includes encoder 322*c* configured to generate a sequence of encoded frames 323*c*' . . . and render node n (320*n*) includes encoder 322*n* configured to generate a sequence of encoded frames 323*n*'.

Each of the sequences of encoded frames (each sequence corresponding to a view of a grid map) is streamed to decoder 330 of client device 106 over the network 150.

Frames in the corresponding sequences of frames that are streamed may each be associated with an identifier (e.g., index number) and configured to be decoded and assembled as a 3D view of the VR environment based on one or more sequences of frames and a point-of-view into the VR environment. In one embodiment, the sequences of encoded frames are streamed via a uni-directional broadcast (e.g., UDP, Unity UDP, multicast, etc.) to the client device. The client device includes one or more decoders configured for decoding and buffering the encoded streams received from the plurality of render nodes. For example, in one embodiment, the decoder is divided into multiple decoders. In one implementation, one decoder is assigned to decode frames delivered from a corresponding encoder on a one-to-one basis. Of course, in other embodiments, one decoder can decode one or more encoded sequences of frames. For example, from render node 1 (320a), the sequence of encoded frames 323a' is streamed to decoder 330-a of client device 106 over path 380a. Decoder 330-a operates to decode and return the encoded frames 323a' back to its original or raw state (or some similar state) to generate sequence of frames 323a, which may correspond to a first view of the grid map of the VR scene. Similar functionality is performed for each of the other sequences of encoded frames. In particular, from render node 2 (320b), the sequence of encoded frames 323b' is streamed to decoder 330-b over path 380b to generate a sequence of decoded frames 323b, which may correspond to a second view of the grid map. Also, from render node 3 (320c), the sequence of encoded frames 323c' is streamed to decoder 330-c over path 380c to generate a sequence of decoded frames 323c, which may correspond to a third view of the grid map. The process continues for each sequence of encoded frames, including from render node n (320n), the sequence of encoded frames 323n' is streamed to decoder 330-n over path 380n to generate a sequence of decoded frames 323n, which may correspond to a third view of the grid map.

Further, after decoding, the decoded sequences of frames are stored into one or more buffers 335. For example, the decoded sequence of frames 323a that corresponds to the first view of the grid map is stored in a first buffer 335-a; the decoded sequence of frames 323b that corresponds to the second view of the grid map is stored in a second buffer 335-b; the decoded sequence of frames 323c that corresponds to the third view of the grid map is stored in a third buffer 335-c . . . the decoded sequence of frames 323n that corresponds to the n-th view of the grid map is stored in an n-th buffer 335-n. Based on one or more decoded sequences of encoded frames of corresponding views into the VR environment for the given location, the client device is configured for generating a current point-of-view that corresponds to a user looking into the VR environment.

In one embodiment, the master node also may synchronize the operations of a plurality of render nodes (e.g., through synchronization packets), each of which renders video frames for a corresponding view of a grid map. In another implementation, when the master node and the render nodes are placed into a server rack 370 for communication, synchronization of communication as well as the rendering of frames for each side of a grid map can be realized because of the configuration of the communication paths within the rack. For example, the communication to each of the render nodes is accomplished simultaneously, such as by broadcasting (e.g., UDP, Unity UDP, multicast, etc.) the primitives by the master node to each of the plurality of render nodes. In still another embodiment, synchronization may be achieved through the application of timestamps at the render nodes. In particular, each of the render nodes is configured to attach timestamps or frame numbers to frames of corresponding sequence of frames. The timestamps are utilized for synchronization of frames from different sequences of frames at the client device. For example, the client device may only blend and/or display frames having the same or similar timestamp.

Figure 4:
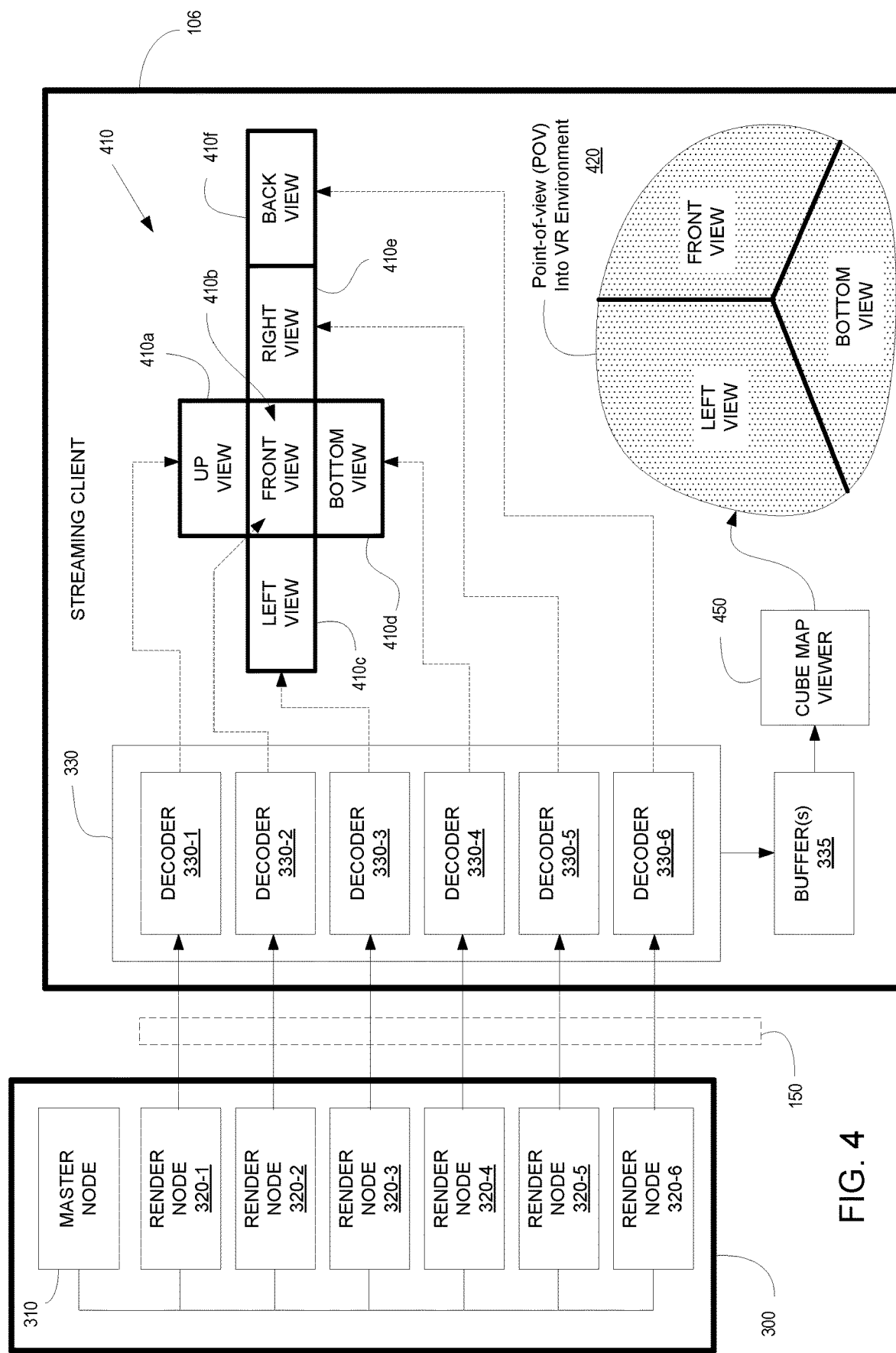
FIG. 4 is a data flow diagram illustrating the generation of VR content at a cloud system using multiple servers and/or compute nodes of a cloud system, including six render nodes to generate views for the six sides of cube map and a master node for executing the game logic of the gaming application and managing the synchronization of the render nodes, in accordance with one embodiment of the present disclosure.

FIG. 4 is a data flow diagram illustrating the generation of VR content at a cloud system 114 using multiple servers and/or compute nodes, including six render nodes to generate views for the six sides of cube map and a master node for executing the game logic of the gaming application and managing the synchronization of the render nodes, in accordance with one embodiment of the present disclosure. The configuration of the split hierarchy graphics processor system as implemented within the executing engine (e.g., gaming engine) 300 includes multiple servers/compute nodes on a cloud system (e.g., cloud system 114), such as the master node 310 and the plurality of render nodes 320.

Specifically, FIG. 4 is one implementation of the generic split hierarchy graphics processor system of FIG. 3 that is configured for performing multi-server cloud VR streaming of VR content based on a grid map. In particular, FIG. 4 illustrates a split hierarchy graphics processor system that is configured for rendering views for a cube map 410 having six sides to perform multi-server cloud VR streaming of VR content. The split hierarchy graphics processor system includes a master node 310 and a plurality of render nodes 320, as previously described.

In particular, the master node 310 is configured to execute the gaming application and/or interactive VR application, as previously described. For example, the master node 310 runs game logic, application logic, executes scripts, performs simulation of objects (e.g., executing a physics simulation modeler configured for applying a simulation of natural or user defined laws of physics to the objects), etc. In general, the master node 310 is configured for performing the CPU functions of a graphics pipeline to execute the interactive VR application responsive to input from a client device 106. The master node generates a plurality of primitives for the objects in a VR environment.

Also, the plurality of render nodes 320 is configured for performing rendering based on the primitives for a plurality of views into the VR environment taken from a location in the VR environment. The views correspond to each side of a cube map 410. In particular, each render node is configured for performing render operations to generate a sequence of video frames for a corresponding view, such as rasterization, fragment shading, output merging, frame buffering, etc. The sequence of video frames is streamed to a client device. Prior to streaming, each of the plurality of render nodes 320 encodes its corresponding stream of frames to compress the sequence of video frames for communication efficiency as it is being streamed through the network 150 to the client 106.

On the client 106, the decoder 330 receives the streams of sequences of encoded frames. The decoder 330 is configured to decode and buffer (store in buffer 335) the encoded streams received from the plurality of render nodes 320. For example, in one embodiment, the decoder is divided into multiple decoders. In one implementation, one decoder is assigned to decode frames delivered from a corresponding encoder on a one-to-one basis. For example, decoder 330-1 is paired with encoder 320-1; decoder 330-2 is paired with encoder 320-2; decoder 330-3 is paired with encoder 320-3; decoder 330-4 is paired with encoder 320-4; decoder 330-5 is paired with encoder 320-5; and decoder 330-6 is paired with encoder 320-6. Of course, in other embodiments, one decoder can decode one or more encoded sequences of frames.

In particular, FIG. 4 illustrates the encoding and decoding process for each side of the cube map. For example, render node 320-1 generates a first view, and encodes and streams the first view to decoder 330-1 which decodes and buffers the encoded sequence of frames ready for displaying the first view (e.g., up view 410a); render node 320-2 generates a second view, and encodes and streams the second view to decoder 330-2, which decodes and buffers the encoded sequence of frames ready for displaying the second view (e.g., front view 410b); render node 320-3 generates a third view, and encodes and streams the third view to decoder 330-3 which decodes and buffers the encoded sequence of frames ready for displaying the third view (e.g., left view 410c); render node 320-4 generates a fourth view, and encodes and streams the fourth view to decoder 330-4 which decodes and buffers the encoded sequence of frames ready for displaying the fourth view (e.g., bottom view 410d); render node 320-5 generates a fifth view, and encodes and streams the fifth view to decoder 330-5 which decodes and buffers the encoded sequence of frames ready for displaying the fifth view (e.g., right view 410e); and render node 320-6 generates a sixth view, and encodes and streams the sixth view to decoder 330-6 which decodes and buffers the encoded sequence of frames ready for displaying the sixth view (e.g., back view 410f).

As shown, the decoded streams of frames corresponding to each of the views of a cube map are buffered in one or more buffers 335. The views are ready for display when called by the cube map viewer 450. In particular, the cube map viewer 450 is configured to generate a current view for a point-of-view of the user for a given location in the VR environment. The current view is based on one or more decoded sequences of encoded frames of views of the cube map. For example, as an example the point-of-view of the user may include portions of the left view 410c, the front view 410b, and the bottom view 410d. As such, the current view of the user is a combination of those three views, wherein the cube map viewer 450 is configured to combine and/or blend the left view, the front view, and the bottom view to generate the point-of-view (POV) 420.

Figure 5:
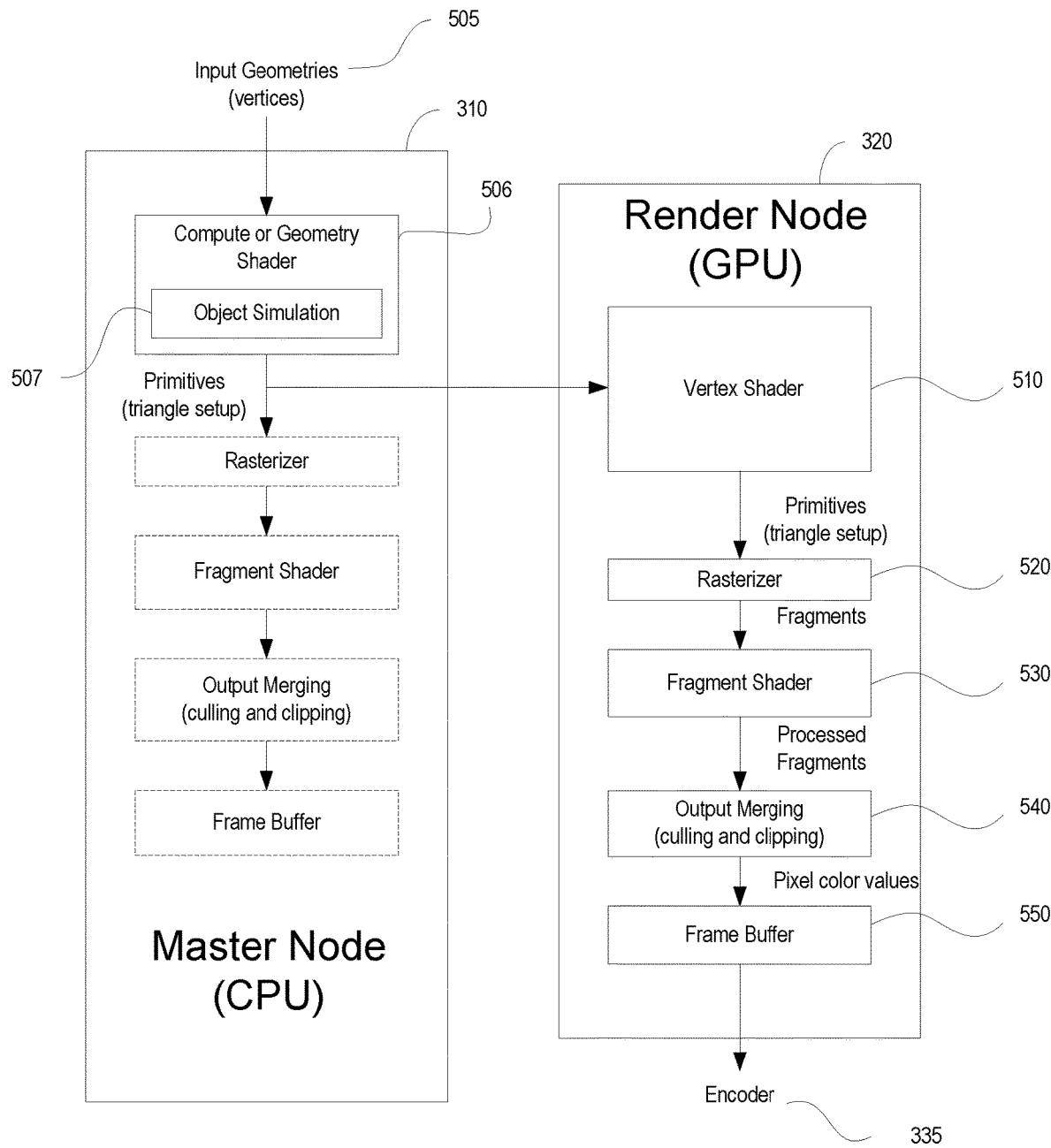
FIG. 5 illustrates a split hierarchy processor system configured to implement a graphics pipeline, the split hierarchy implemented across multiple servers and/or compute nodes of a cloud system to perform functions of a central processing unit (CPU) and/or graphics processing unit (GPU) to execute game logic and for independently rendering image frames for each of the sides of a grid map, in accordance with one embodiment of the present disclosure.

FIG. 5 illustrates a split hierarchy processor system configured to implement a rendering pipeline 500, in accordance with one embodiment of the present disclosure. In particular, the split hierarchy processor system is implemented across multiple servers and/or compute nodes of a cloud system to perform functions of a CPU and/or GPU to execute logic and perform rendering for a gaming application and/or an interactive VR application. Image frames for each of the sides of a grid map are independently rendered, as previously described. The process shown in the rendering pipeline 500 may be performed in association with one view of a side of a grid map. The rendering pipeline 500 may be implemented within HMD 102, computer 106, and cloud gaming server 114, alone or in combination, as previously described The rendering pipeline 500 is illustrative of the general process for rendering images using 3D (three dimensional) polygon rendering processes. The rendering pipeline 500 for a rendered image outputs corresponding color information for each of the pixels in a display (e.g., HMD), wherein the color information may represent texture and shading (e.g., color, shadowing, etc.). Rendering pipeline 500 is implementable within the split hierarchy processor systems at a cloud system, as previously described in relation to FIGS. 1A-1C and 3-4.

Rendering pipeline 500 is configured to perform object animation, and includes a compute shader 506 in the master node 310, and a programmable shader representing one of the render nodes 320 configured for rendering including processing vertex data, assemble vertices into primitives (e.g., polygons), perform rasterization to generate fragments from the primitives relative to the display, and then compute color and depth values for each fragment, as well as blend the fragments on a pixel by pixel basis for storing to a framebuffer for displaying. The operations performed by the compute shader 506 at the master node 310 (e.g., for animation) may be performed either in the CPU or GPU, but is shown being performed in the CPU for illustrative purposes. The operations performed by programmable shader as a render node 320 are generally more suited for execution in the GPU for better performance and efficiency.

As shown, the rendering pipeline 500 receives input geometries 505 corresponding to objects within the 3D environment. For example, the input geometries 505 may include vertices within a 3D gaming world, and information corresponding to each of the vertices. A given object within the gaming world can be represented using polygons (e.g., triangles) defined by vertices, wherein the surface of a corresponding polygon is then processed through the remaining portions of rendering pipeline 500 (e.g., through render node 320) to achieve a final effect (e.g., color, texture, etc.). Vertex attributes may include normal (e.g., which direction is the light in relation to the vertex), color (e.g., RGB—red, green, and blue triple, etc.), and texture coordinate/mapping information. For ease of illustration, the input geometries for the 3D gaming world are shown to be inputted to compute shader 506 of the master node 310, though the geometries may also be partitioned such that geometries for the particle system are input to compute shader, and remaining geometries input to vertex shader 510 of the programmable shader as the render node 320. For example, the input geometries may be input into a vertex buffer that can be shared between the shaders.

In particular, compute shader 506 in the master node 310 performs object animation/simulation (e.g., calculate object and/or particle motion, etc.) from frame-to-frame depending on the forces exerted on and/or applied by the object (e.g., external physical forces, such as gravity, etc. and internal forces of the object inducing movement). Generally, from the first frame to succeeding frames, the compute shader 506 in the master node 310 performs operations to animate the object, or provide motion to the object. In particular, for each frame rendered, the animation of the object is updated (e.g., position, orientation, velocity, etc.) in discrete time steps (e.g., frame-by-frame). For example, the animation/simulation module 507 is configured for providing animation or movement to an object (e.g., through the application of physics), and more particularly movement (e.g., by updating object positions or vertices of objects) in discrete time steps (e.g., from frame-to-frame). The compute shader 506 in the master node 310 acting as a CPU then issues a draw command for the polygon vertices that is performed by the render node 320.

An output of the compute shader 506 may include primitives (e.g., vertices, polygons, etc.) of the object. As implemented within a GPU configuration, the remaining components (e.g., rasterizer, fragment shader, and renderer—including the output merger and frame buffer) are idle, such that the output from the compute shader 506 is then delivered and/or shared with the programmable shader as the render node 320 to perform the more traditional GPU operations including rendering. Of course, in a CPU implementation, master node 310 could be simplified to only include compute shader 506 and object simulation module 507.

In particular, the animation results generated by the compute shader 506 may be stored to a vertex buffer, which is then accessed by the render node 320 which is configured to perform a projection of the polygon vertices onto a display (e.g., of the HMD) and tessellation of the projected polygons for purposes of rendering the polygon vertices. That is, the render node 320 when rendering may be configured to further build up the polygons and/or primitives that make up the objects within the 3D virtual environment, to include performing lighting, shadowing, and shading calculations for the polygons, which is dependent on the lighting for the scene.

Specifically, the animated object is drawn from frame-to-frame using the operations performed by the render node 320. In particular, the animation results from compute shader 506 of the master node are stored to a vertex buffer, which is then input to the render node 320 (e.g., as accessed by the vertex shader 510). The values in the vertex buffer can be shared between stages of the graphics pipeline 500. More particularly, the vertex shader 510 receives the input geometries 505 directly, and from compute shader 506, as previously described, and builds the polygons or primitives that make up the objects within the 3D scene. Vertex shader 510 may further build the primitives for the animated object if not completed by the compute shader 506. That is, the vertex shader 510 builds up the objects using the primitives as they are placed within the gaming world. For example, the vertex shader 510 may be configured to perform lighting and shadowing calculations for the polygons, which is dependent on the lighting for the scene. The primitives are output by the vertex processor 510 and delivered to the next stage of the graphics pipeline 500. Additional operations may also be performed by the vertex processor 510 such as clipping (e.g., identify and disregard primitives that are outside the viewing frustum as defined by the viewing location in the gaming world).

The primitives output by the vertex processor 510 are fed into the rasterizer 520 that is configured to project objects in the scene to a two-dimensional (2D) image plane defined by the viewing location in the 3D gaming world (e.g., camera location, user eye location, etc.). At a simplistic level, the rasterizer 520 looks at each primitive and determines which pixels are affected by the corresponding primitive. In particular, the rasterizer 520 partitions the primitives into pixel sized fragments, wherein each fragment corresponds to a pixel in the display and/or a reference plane associated with the rendering point-of-view (e.g., camera view). That is, fragmentation of the primitives may be used to break a primitive to pixel sized fragments, wherein each fragment corresponds to a pixel in the display and/or a reference plane associated with the rendering point-of-view. Additional operations may also be performed by the rasterizer 520 such as clipping (identify and disregard fragments that are outside the viewing frustum) and culling (disregard fragments that are occluded by closer objects) to the viewing location.

The fragment processor 530 at its core performs shading operations on the fragments to determine how the color and brightness of a primitive varies with available lighting. For example, fragment processor 530 may determine depth, color, normal and texture coordinates (e.g., texture details) for each fragment, and may further determine appropriate levels of light, darkness, and color for the fragments. In particular, fragment processor 530 calculates the traits of each fragment, including color and other attributes (e.g., z-depth for distance from the viewing location, and alpha values for transparency). In addition, the fragment processor 530 applies lighting effects to the fragments based on the available lighting affecting the corresponding fragments. Further, the fragment processor 530 may apply shadowing effects for each fragment. The output of the fragment processor 530 includes processed fragments (e.g., texture and shading information to include shadowing) and is delivered to the next stage of the rendering pipeline 500.

The output merging component 540 calculates the traits of each pixel depending on the fragments that contribute and/or affect each corresponding pixel. That is, the fragments of all primitives in the 3D gaming world are combined into the 2D color pixel for the display. For example, fragments that contribute to texture and shading information for a corresponding pixel are combined to output a final color value for the pixel delivered to the next stage in the rendering pipeline 500. The output merging component 540 may perform optional blending of values between fragments and/or pixels determined from the fragment processor 530. That is, it is important to note that one or more fragments may contribute to the color of a corresponding pixel when displaying an image. For example, for a given pixel fragments of all primitives in the 3D virtual environment are combined into the pixel for the display. As such, overall texture and shading information for a corresponding pixel are combined to output a final color value for the pixel.

These color values for each pixel may be stored in a frame buffer 550, which may be scanned in a traditional GPU pipeline to the corresponding pixels when displaying a corresponding image of a scene on a frame-by-frame basis. However, rather than delivering the sequence of frames to a display, in embodiments of the present invention, a render node 320 is configured to render frames for a particular view/side of a grid map (e.g., cube map), encode that sequence (e.g., through encoder 335), and then stream the encoded sequence of frames to a client device. The rendered frames from that render node may or may not contribute to the current point-of-view that is displayed for the user (e.g., in HMD). However, based on one or more sequences of frames corresponding to one or more views of a grid map, the current point-of-view may be generated, such as through a cube map viewer (see FIG. 4) of the client device.

Figure 6:
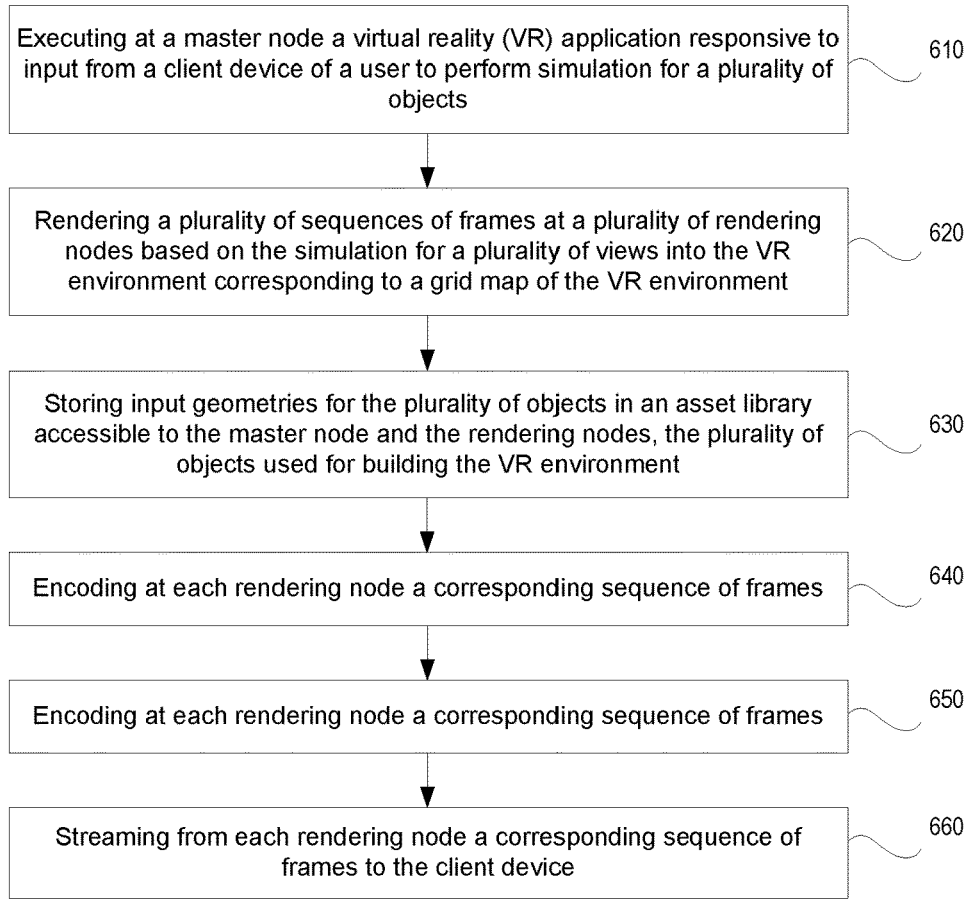
FIG. 6 is a flow diagram illustrating steps in a method for implementing a graphics pipeline using multiple servers and/or compute nodes of a cloud system, in accordance with one embodiment of the present disclosure.

With the detailed description of the various modules of the gaming console, HMD, and cloud gaming server, a method for performing graphics processing using a split hierarchy graphics processor system of a cloud system is now described in relation to flow diagram 600 of FIG. 6, in accordance with one embodiment of the present disclosure. As previously described, flow diagram 600 illustrates the process and data flow of operations involved for implementing a split hierarchy processor system across multiple servers and/or compute nodes of a cloud system to perform functions of a CPU and/or GPU to execute logic and perform rendering for a gaming application and/or an interactive VR application. In particular, the method of flow diagram 600 may be performed at least in part by the master node 310 and plurality of render nodes 320 of FIGS. 1-5.

At 610, the method includes executing at a master node of a cloud system a VR application responsive to input from a client device of a user to generate a plurality of primitives for a plurality of objects in a VR environment of the VR application. In particular, the master node is configured to execute the gaming application and/or interactive VR application, as previously described. For example, the master node 310 is configured for performing CPU functions responsive to input from a client device, including running game logic and/or application logic, executing scripts, performing simulation of objects (e.g., executing a physics simulation modeler configured for applying a simulation of natural or user defined laws of physics to the objects), etc. The master node generates a plurality of primitives for the objects in a VR environment.

At 620, the method includes rendering a plurality of sequences of frames at a plurality of render nodes based on the plurality of primitives for a plurality of views into the VR environment taken from a location in the VR environment. For example, the plurality of views correspond to sides of a grid map of the VR environment, wherein a corresponding sequence of frames is associated with a corresponding view. In particular, each render node is configured for performing render operations to generate a sequence of video frames for a corresponding view, such as rasterization, fragment shading, output merging, frame buffering, etc.

In still other embodiments, each node is configured to perform a specific function. For example, instead of performing rendering of a side of a grid map, the node may be assigned to perform a specific computer functionality that is compute intensive. By performing the computer functionality at dedicated nodes, the remaining nodes (e.g., master node) may be free to perform other vital functionality without having to expend its resources to perform the functionality that is compute intensive.

At 630, the method includes storing input geometries for the plurality of objects in an asset library, wherein the plurality of objects in the asset library are accessible by the master node and the plurality of render nodes. The plurality of objects as represented by corresponding input geometries is used for building the VR environment. Based on the input geometries and control input, the master node generates primitives for the objects after applying object simulation, etc. The render nodes perform rendering of the objects (as represented by the input geometries) based on the output from the master node (e.g., motion of an object after application of physics simulation). In one embodiment, the master node and the render nodes are configured within a server rack, and as such, synchronization is achieved within the communication space by broadcasting the primitives from the master node to each of the render nodes.

At 640, the method includes encoding at each render node a corresponding sequence of frames. Encoding is performed to compress the sequence of video frames for communication efficiency as it is being streamed through a network to the client device. At 650 after encoding, the method includes streaming from each render node a corresponding sequence of frames to the client device, wherein each corresponding sequence of frames corresponds to a side or view of the grid map. The client device is configured to decode each of the sequences of encoded frames, and store the decoded sequences of encoded frames in a plurality of buffers for display when called. In addition, the client device is configured to generate a point-of-view at a given location in the VR environment based on one or more decoded sequences of encoded frames of views of a grid map of the VR environment.

Figure 7:
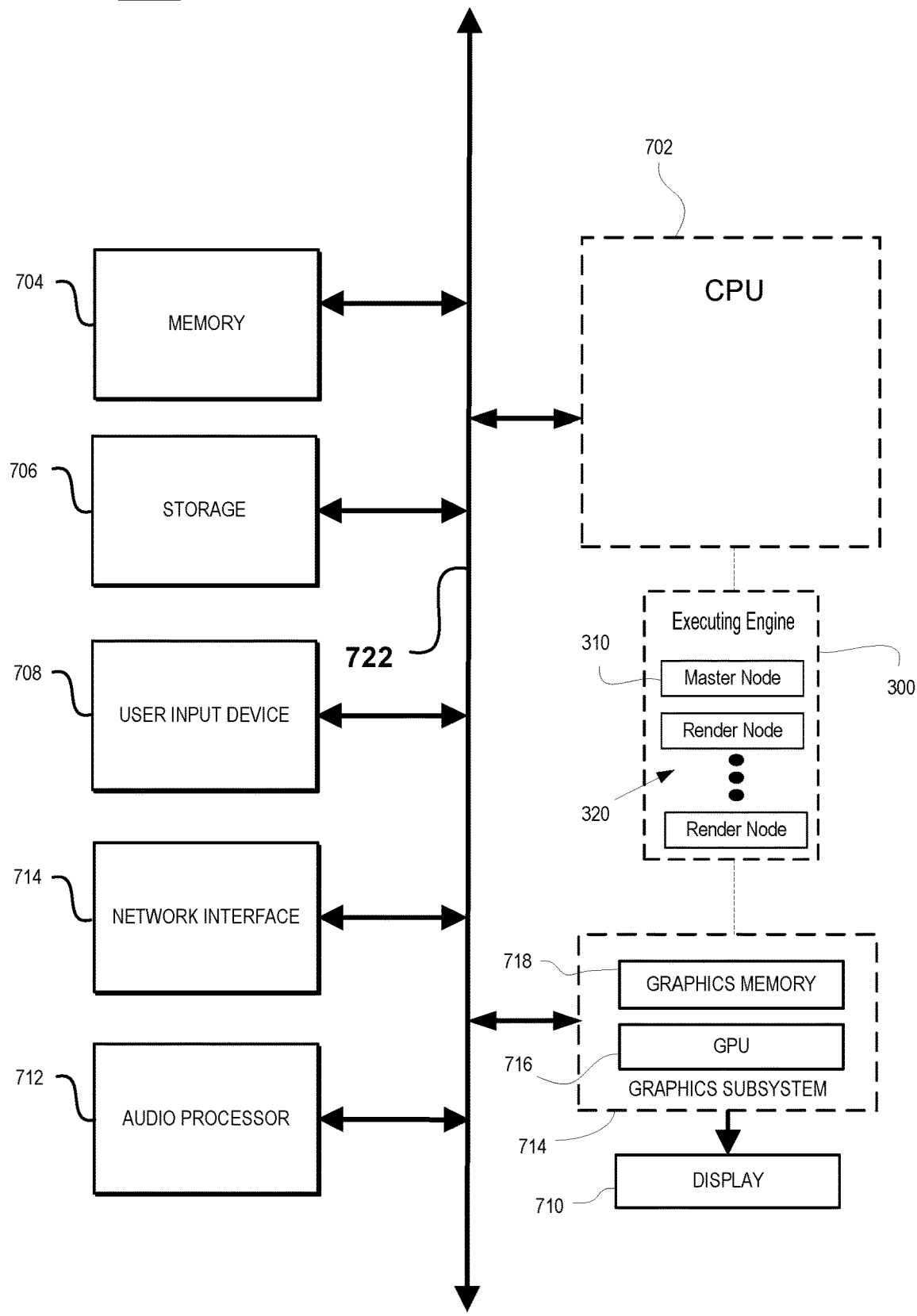
FIG. 7 illustrates a computer system implementing a graphics pipeline using multiple servers and/or compute nodes of a cloud system, in accordance with one embodiment of the present disclosure. hypervisor system

FIG. 7 illustrates components of an example device 700 that can be used to perform aspects of the various embodiments of the present disclosure. In particular, FIG. 7 illustrates a computer system implementing a split hierarchy processor system across multiple servers and/or compute nodes of a cloud system to perform functions of a CPU and/or GPU to execute logic and perform rendering for a gaming application and/or an interactive VR application, in accordance with one embodiment of the present disclosure. In one implementation, FIG. 7 illustrates an exemplary hardware system suitable for implementing a split hierarchy processor system across multiple servers and/or compute nodes of a cloud system. In other embodiments, the computer system may be implemented as a virtual machine (VM) within a cloud service. For example, the cloud service may include a virtualization layer supporting one or more VMs to provide compute power, and virtual storage. The virtualization layer utilizes underlying hardware and physical data storage accessible outside of the virtualized space. This block diagram illustrates a device 700 that can incorporate or can be a server computer, virtualized computer, personal computer, video game console, personal digital assistant, or other digital device, suitable for practicing an embodiment of the disclosure. Device 700 includes a central processing unit (CPU) 702 for running software applications and optionally an operating system. CPU 702 may be comprised of one or more homogeneous or heterogeneous processing cores. For example, CPU 702 is one or more general-purpose microprocessors having one or more processing cores. Further embodiments can be implemented using one or more CPUs with microprocessor architectures specifically adapted for highly parallel and computationally intensive applications, such as media and interactive entertainment applications, or applications configured for providing prediction of a landing point on a display associated with a gaze direction of the eye(s) of a user during and/or at the end of saccade that is defined in association with the user viewing the display, as previously described.

Memory 704 stores applications and data for use by the CPU 702. Storage 706 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 708 communicate user inputs from one or more users to device 700, examples of which may include keyboards, mice, joysticks, touch pads, touch screens, still or video recorders/cameras, tracking devices for recognizing gestures, and/or microphones. Network interface 714 allows device 700 to communicate with other computer systems via an electronic communications network, and may include wired or wireless communication over local area networks and wide area networks such as the internet. An audio processor 712 is adapted to generate analog or digital audio output from instructions and/or data provided by the CPU 702, memory 704, and/or storage 706. The components of device 700, including CPU 702, memory 704, data storage 706, user input devices 708, network interface 710, and audio processor 712 are connected via one or more data buses 722

A graphics subsystem 714 is further connected with data bus 722 and the components of the device 700. The graphics subsystem 714 includes a graphics processing unit (GPU) 716 and graphics memory 718. Graphics memory 718 includes a display memory (e.g., a frame buffer) used for storing pixel data for each pixel of an output image. Graphics memory 718 can be integrated in the same device as GPU 716, connected as a separate device with GPU 716, and/or implemented within memory 704. Pixel data can be provided to graphics memory 718 directly from the CPU 702. Alternatively, CPU 702 provides the GPU 716 with data and/or instructions defining the desired output images, from which the GPU 716 generates the pixel data of one or more output images. The data and/or instructions defining the desired output images can be stored in memory 704 and/or graphics memory 718. In an embodiment, the GPU 716 includes 3D rendering capabilities for generating pixel data for output images from instructions and data defining the geometry, lighting, shading, texturing, motion, and/or camera parameters for a scene. The GPU 716 can further include one or more programmable execution units capable of executing shader programs.

The graphics subsystem 714 periodically outputs pixel data for an image from graphics memory 718 to be displayed on display device 710, or to be projected by projection system 740. Display device 710 can be any device capable of displaying visual information in response to a signal from the device 700, including CRT, LCD, plasma, and OLED displays. Device 700 can provide the display device 710 with an analog or digital signal, for example.

As shown in FIG. 7, the device 700 may be configured to implement a split hierarchy graphics processor system for performing multi-server cloud VR streaming of VR content. For example, the device 700 may be configured within a cloud system and includes an executing engine 300 (e.g., gaming engine) that further includes a master node 310 and a plurality of render nodes 320. The master node 310 is configured to perform CPU functions when executing the gaming and/or interactive VR application, such as performing simulation, running scripts, and providing the necessary input (e.g., primitives) to the graphics engine for performing rendering. The plurality of render nodes 320 is configured to perform rendering of frames for each side of a grid map.

Figure 8:
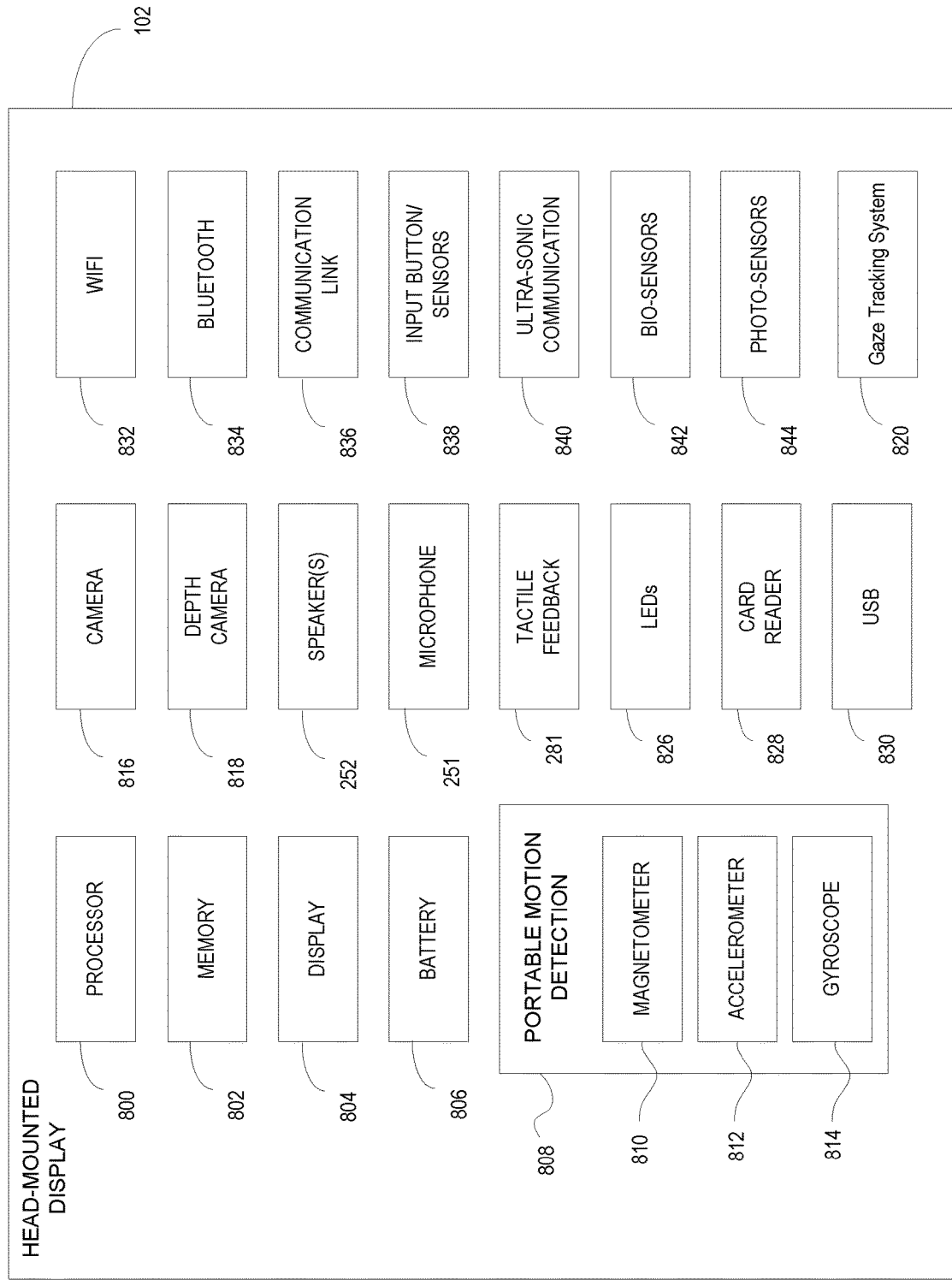
FIG. 8 illustrates components of an example device that can be used to perform aspects of the various embodiments of the present disclosure, in accordance with an embodiment of the disclosure.

It should be understood that the embodiments described herein may be executed on any type of client device. In some embodiments, the client device is a head mounted display (HMD), or projection system. FIG. 8, a diagram illustrating components of a head-mounted display 102 is shown, in accordance with an embodiment of the disclosure. The HMD 102 may be configured to predict a landing point on a display of an HMD associated with the gaze direction of the eye(s) of a user during and/or at the end of a saccade that is defined in association with the user viewing the display, and providing the predicted landing point to a GPU in a late update operation.

The head-mounted display 102 includes a processor 800 for executing program instructions. A memory 802 is provided for storage purposes, and may include both volatile and non-volatile memory. A display 804 is included which provides a visual interface that a user may view. A battery 806 is provided as a power source for the head-mounted display 102. A motion detection module 808 may include any of various kinds of motion sensitive hardware, such as a magnetometer 810A, an accelerometer 812, and a gyroscope 814.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 812 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 810A are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 812 is used together with magnetometer 810A to obtain the inclination and azimuth of the head-mounted display 102.

A gyroscope is a device for measuring or maintaining orientation, based on the principles of angular momentum. In one embodiment, three gyroscopes 814 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 816 is provided for capturing images and image streams of a real environment. More than one camera may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 818 may be included in the head-mounted display 102 for sensing depth information of objects in a real environment.

In one embodiment, a camera integrated on a front face of the HMD may be used to provide warnings regarding safety. For example, if the user is approaching a wall or object, the user may be warned. In one embodiment, the use may be provided with an outline view of physical objects in the room, to warn the user of their presence. The outline may, for example, be an overlay in the virtual environment. In some embodiments, the HMD user may be provided with a view to a reference marker, that is overlaid in, for example, the floor. For instance, the marker may provide the user a reference of where the center of the room is, which in which the user is playing the game. This may provide, for example, visual information to the user of where the user should move to avoid hitting a wall or other object in the room. Tactile warnings can also be provided to the user, and/or audio warnings, to provide more safety for when the user wears and plays games or navigates content with an HMD.

The head-mounted display 102 includes speakers 252 for providing audio output. Also, a microphone 251 may be included for capturing audio from the real environment, including sounds from the ambient environment, speech made by the user, etc. The head-mounted display 102 includes tactile feedback module 281 for providing tactile feedback to the user. In one embodiment, the tactile feedback module 281 is capable of causing movement and/or vibration of the head-mounted display 102 so as to provide tactile feedback to the user.

LEDs 826 are provided as visual indicators of statuses of the head-mounted display 102. For example, an LED may indicate battery level, power on, etc. A card reader 828 is provided to enable the head-mounted display 102 to read and write information to and from a memory card. A USB interface 830 is included as one example of an interface for enabling connection of peripheral devices, or connection to other devices, such as other portable devices, computers, etc. In various embodiments of the head-mounted display 102, any of various kinds of interfaces may be included to enable greater connectivity of the head-mounted display 102.

A Wi-Fi module 832 is included for enabling connection to the Internet via wireless networking technologies. Also, the head-mounted display 102 includes a Bluetooth module 834 for enabling wireless connection to other devices. A communications link 836 may also be included for connection to other devices. In one embodiment, the communications link 836 utilizes infrared transmission for wireless communication. In other embodiments, the communications link 836 may utilize any of various wireless or wired transmission protocols for communication with other devices.

Input buttons/sensors 838 are included to provide an input interface for the user. Any of various kinds of input interfaces may be included, such as buttons, touchpad, joystick, trackball, etc. An ultra-sonic communication module 840 may be included in head-mounted display 102 for facilitating communication with other devices via ultra-sonic technologies.

Bio-sensors 842 are included to enable detection of physiological data from a user. In one embodiment, the bio-sensors 842 include one or more dry electrodes for detecting bio-electric signals of the user through the user's skin.

Photo-sensors 844 are included to respond to signals from emitters (e.g., infrared base stations) placed in a 3-dimensional physical environment. The gaming console analyzes the information from the photo-sensors 844 and emitters to determine position and orientation information related to the head-mounted display 102.

In addition, gaze tracking system 820 is included and configured to enable tracking of the gaze of the user. For example, system 820 may include gaze tracking cameras (e.g., sensors) which captures images of the user's eyes, which are then analyzed to determine the gaze direction of the user. In one embodiment, information about the gaze direction of the user can be utilized to affect the video rendering and/or predict landing points on a display towards with the gaze of a user is directed during or at the end of a saccade. Also, video rendering in the direction of gaze can be prioritized or emphasized, such as by providing greater detail, higher resolution through foveated rendering, higher resolution of a particle system effect displayed in the foveal region, lower resolution of a particle system effect displayed outside the foveal region, or faster updates in the region where the user is looking.

The foregoing components of head-mounted display 102 have been described as merely exemplary components that may be included in head-mounted display 102. In various embodiments of the disclosure, the head-mounted display 102 may or may not include some of the various aforementioned components. Embodiments of the head-mounted display 102 may additionally include other components not presently described, but known in the art, for purposes of facilitating aspects of the present disclosure as herein described.

It will be appreciated by those skilled in the art that in various embodiments of the disclosure, the aforementioned head mounted device may be utilized in conjunction with an interactive application displayed on a display to provide various interactive functions. The exemplary embodiments described herein are provided by way of example only, and not by way of limitation.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A Game Processing Server (GPS) (or simply a "game server") is used by game clients to play single and multiplayer video games. Most video games played over the Internet operate via a connection to the game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices to exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by a software company that owns the game title, allowing them to control and update content.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g. accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g. feedback data) from the client device or directly from the cloud gaming server.

Figure 9:
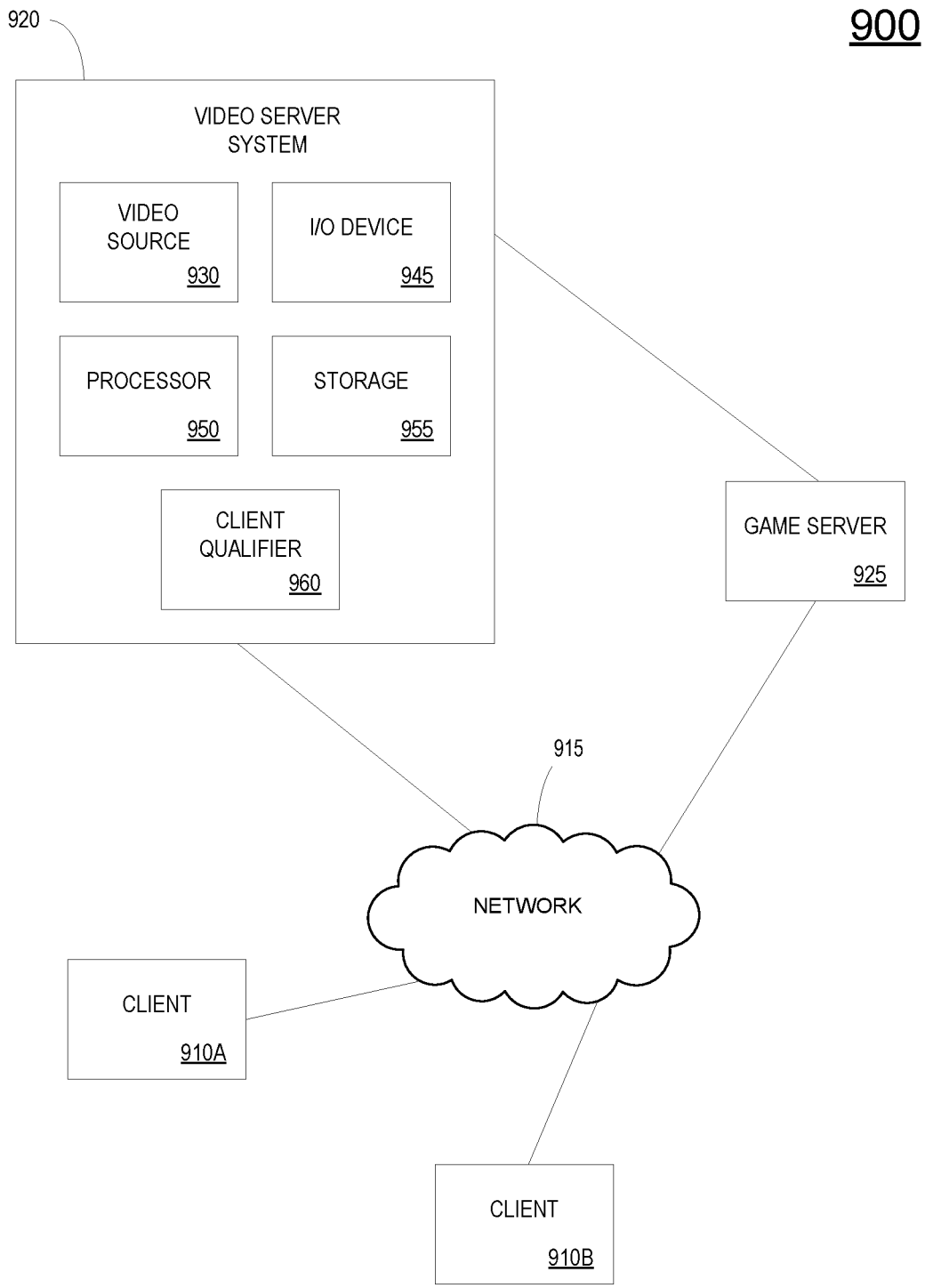
FIG. 9 is a block diagram of a Game System, according to various embodiments of the disclosure.

In particular, FIG. 9 is a block diagram of a Game System 900, according to various embodiments of the disclosure. Game System 900 is configured to provide a video stream to one or more Clients 910 via a Network 915, such as in a single-player mode or multi-player mode. Game System 900 typically includes a Video Server System 920 and an optional game server 925. Video Server System 920 is configured to provide the video stream to the one or more Clients 910 with a minimal quality of service. For example, Video Server System 920 may receive a game command that changes the state of or a point of view within a video game, and provide Clients 910 with an updated video stream reflecting this change in state with minimal lag time. The Video Server System 920 may be configured to provide the video stream in a wide variety of alternative video formats, including formats yet to be defined. Further, the video stream may include video frames configured for presentation to a user at a wide variety of frame rates. Typical frame rates are 30 frames per second, 80 frames per second, and 820 frames per second. Although higher or lower frame rates are included in alternative embodiments of the disclosure.

Clients 910, referred to herein individually as 910A, 910B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 910 are configured to receive encoded video streams (i.e., compressed), decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 910 or on a separate device such as a monitor or television. Clients 910 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 910 are optionally geographically dispersed. The number of clients included in Game System 900 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 920 to deliver a game viewed through the HMD. In one embodiment, the game console receives the video stream from the video server system 920, and the game console forwards the video stream, or updates to the video stream, to the HMD for rendering.

Clients 910 are configured to receive video streams via Network 915. Network 915 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 910 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 910 may, but are not required to, further include systems configured for modifying received video. For example, a client may be configured to perform further rendering, to overlay one video image on another video image, to crop a video image, and/or the like. For example, Clients 910 may be configured to receive various types of video frames, such as I-frames, P-frames and B-frames, and to process these frames into images for display to a user. In some embodiments, a member of Clients 910 is configured to perform further rendering, shading, conversion to 3-D, or like operations on the video stream. A member of Clients 910 is optionally configured to receive more than one audio or video stream. Input devices of Clients 910 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 910 is generated and provided by Video Server System 920. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 910 are typically configured to receive inputs from a user. These inputs may include game commands configured to change the state of the video game or otherwise affect gameplay. The game commands can be received using input devices and/or may be automatically generated by computing instructions executing on Clients 910. The received game commands are communicated from Clients 910 via Network 915 to Video Server System 920 and/or Game Server 925. For example, in some embodiments, the game commands are communicated to Game Server 925 via Video Server System 920. In some embodiments, separate copies of the game commands are communicated from Clients 910 to Game Server 925 and Video Server System 920. The communication of game commands is optionally dependent on the identity of the command. Game commands are optionally communicated from Client 910A through a different route or communication channel that that used to provide audio or video streams to Client 910A.

Game Server 925 is optionally operated by a different entity than Video Server System 920. For example, Game Server 925 may be operated by the publisher of a multiplayer game. In this example, Video Server System 920 is optionally viewed as a client by Game Server 925 and optionally configured to appear from the point of view of Game Server 925 to be a prior art client executing a prior art game engine. Communication between Video Server System 920 and Game Server 925 optionally occurs via Network 915. As such, Game Server 925 can be a prior art multiplayer game server that sends game state information to multiple clients, one of which is game server system 920. Video Server System 920 may be configured to communicate with multiple instances of Game Server 925 at the same time. For example, Video Server System 920 can be configured to provide a plurality of different video games to different users. Each of these different video games may be supported by a different Game Server 925 and/or published by different entities. In some embodiments, several geographically distributed instances of Video Server System 920 are configured to provide game video to a plurality of different users. Each of these instances of Video Server System 920 may be in communication with the same instance of Game Server 925. Communication between Video Server System 920 and one or more Game Server 925 optionally occurs via a dedicated communication channel. For example, Video Server System 920 may be connected to Game Server 925 via a high bandwidth channel that is dedicated to communication between these two systems.

Video Server System 920 comprises at least a Video Source 930, an I/O Device 945, a Processor 950, and non-transitory Storage 955. Video Server System 920 may include one computing device or be distributed among a plurality of computing devices. These computing devices are optionally connected via a communications system such as a local area network.

Video Source 930 is configured to provide a video stream, e.g., streaming video or a series of video frames that form a moving picture. In some embodiments, Video Source 930 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects.

The game state is typically maintained based on game rules, as well as game commands such as move, turn, attack, set focus to, interact, use, and/or the like. Part of the game engine is optionally disposed within Game Server 925. Game Server 925 may maintain a copy of the state of the game based on game commands received from multiple players using geographically disperse clients. In these cases, the game state is provided by Game Server 925 to Video Source 930, wherein a copy of the game state is stored and rendering is performed. Game Server 925 may receive game commands directly from Clients 910 via Network 915, and/or may receive game commands via Video Server System 920.

Video Source 930 typically includes rendering logic, e.g., hardware, firmware, and/or software stored on a computer readable medium such as Storage 955. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 910. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P"

frame and a "P" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 930 includes a video recording device such as a camera. This camera may be used to generate delayed or live video that can be included in the video stream of a computer game. The resulting video stream optionally includes both rendered images and images recorded using a still or video camera. Video Source 930 may also include storage devices configured to store previously recorded video to be included in a video stream. Video Source 930 may also include motion or positioning sensing devices configured to detect motion or position of an object, e.g., person, and logic configured to determine a game state or produce video-based on the detected motion and/or position.

Video Source 930 is optionally configured to provide overlays configured to be placed on other video. For example, these overlays may include a command interface, log in instructions, messages to a game player, images of other game players, video feeds of other game players (e.g., webcam video). In embodiments of Client 910A including a touch screen interface or a gaze detection interface, the overlay may include a virtual keyboard, joystick, touch pad, and/or the like. In one example of an overlay a player's voice is overlaid on an audio stream. Video Source 930 optionally further includes one or more audio sources.

In embodiments wherein Video Server System 920 is configured to maintain the game state based on input from more than one player, each player may have a different point of view comprising a position and direction of view. Video Source 930 is optionally configured to provide a separate video stream for each player based on their point of view. Further, Video Source 930 may be configured to provide a different frame size, frame data size, and/or encoding to each of Client 910. Video Source 930 is optionally configured to provide 3-D video.

I/O Device 945 is configured for Video Server System 920 to send and/or receive information such as video, commands, requests for information, a game state, gaze information, device motion, device location, user motion, client identities, player identities, game commands, security information, audio, and/or the like. I/O Device 945 typically includes communication hardware such as a network card or modem. I/O Device 945 is configured to communicate with Game Server 925, Network 915, and/or Clients 910.

Processor 950 is configured to execute logic, e.g. software, included within the various components of Video Server System 920 discussed herein. For example, Processor 950 may be programmed with software instructions in order to perform the functions of Video Source 930, Game Server 925, and/or a Client Qualifier 960. Video Server System 920 optionally includes more than one instance of Processor 950. Processor 950 may also be programmed with software instructions in order to execute commands received by Video Server System 920, or to coordinate the operation of the various elements of Game System 900 discussed herein. Processor 950 may include one or more hardware device. Processor 950 is an electronic processor.

Storage 955 includes non-transitory analog and/or digital storage devices. For example, Storage 955 may include an analog storage device configured to store video frames. Storage 955 may include a computer readable digital storage, e.g., a hard drive, an optical drive, or solid state storage. Storage 955 is configured (e.g., by way of an appropriate data structure or file system) to store video frames, artificial frames, a video stream including both video frames and artificial frames, audio frame, an audio stream, and/or the like. Storage 955 is optionally distributed among a plurality of devices. In some embodiments, Storage 955 is configured to store the software components of Video Source 930 discussed elsewhere herein. These components may be stored in a format ready to be provisioned when needed.

Video Server System 920 optionally further comprises Client Qualifier 960. Client Qualifier 960 is configured for remotely determining the capabilities of a client, such as Clients 910A or 910B. These capabilities can include both the capabilities of Client 910A itself as well as the capabilities of one or more communication channels between Client 910A and Video Server System 920. For example, Client Qualifier 960 may be configured to test a communication channel through Network 915.

Client Qualifier 960 can determine (e.g., discover) the capabilities of Client 910A manually or automatically. Manual determination includes communicating with a user of Client 910A and asking the user to provide capabilities. For example, in some embodiments, Client Qualifier 960 is configured to display images, text, and/or the like within a browser of Client 910A. In one embodiment, Client 910A is an HMD that includes a browser. In another embodiment, client 910A is a game console having a browser, which may be displayed on the HMD. The displayed objects request that the user enter information such as operating system, processor, video decoder type, type of network connection, display resolution, etc., of Client 910A. The information entered by the user is communicated back to Client Qualifier 960.

Automatic determination may occur, for example, by execution of an agent on Client 910A and/or by sending test video to Client 910A. The agent may comprise computing instructions, such as java script, embedded in a web page or installed as an add-on. The agent is optionally provided by Client Qualifier 960. In various embodiments, the agent can find out processing power of Client 910A, decoding and display capabilities of Client 910A, lag time reliability and bandwidth of communication channels between Client 910A and Video Server System 920, a display type of Client 910A, firewalls present on Client 910A, hardware of Client 910A, software executing on Client 910A, registry entries within Client 910A, and/or the like.

Client Qualifier 960 includes hardware, firmware, and/or software stored on a computer readable medium. Client Qualifier 960 is optionally disposed on a computing device separate from one or more other elements of Video Server System 920. For example, in some embodiments, Client Qualifier 960 is configured to determine the characteristics of communication channels between Clients 910 and more than one instance of Video Server System 920. In these embodiments the information discovered by Client Qualifier can be used to determine which instance of Video Server System 920 is best suited for delivery of streaming video to one of Clients 910.

While specific embodiments have been provided to implement a split hierarchy graphics processor system for performing multi-server cloud VR streaming of VR content, these are described by way of example and not by way of limitation. Those skilled in the art having read the present disclosure will realize additional embodiments falling within the spirit and scope of the present disclosure.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. An apparatus, comprising:
a plurality of decoders configured for receiving a plurality of encoded sequences of video frames from a plurality of encoders of a plurality of render nodes located at a cloud gaming system, and decoding the plurality of encoded sequences of video frames to generate a plurality of views of a three dimensional representation of a virtual reality (VR) environment corresponding to a location in the VR environment; and
a cube map viewer for generating a point-of-view into the VR environment based on the plurality of views,
wherein each of the plurality of encoders streams a corresponding sequence of video frames of a corresponding view to a corresponding decoder of the plurality of decoders,
wherein a plurality of dedicated communication paths support communication between a plurality of pairs of encoders and decoders, such that each of the plurality of pairs of encoders and decoders is supported by a corresponding and dedicated communication path.

2. The apparatus of claim 1,
wherein the cube map viewer is configured to select one or more corresponding sequences of frames that are decoded of one or more of the plurality of views to generate the point-of-view into the VR environment.

3. The apparatus of claim 2,
wherein the cube map viewer is configured to blend the one or more corresponding sequences of frames that are decoded of the one or more of the plurality of views to generate the point-of-view into the VR environment.

4. The apparatus of claim 1,
wherein the plurality of views corresponds to a plurality of sides of a grid map of the VR environment.

5. The apparatus of claim 4,
wherein the grid map is a cube map including six sides.

6. The apparatus of claim 4,
wherein each of the plurality of sides of the grid map corresponds to one of the plurality of views into the VR environment.

7. The apparatus of claim 1, further comprising:
one or more buffers configured for storing the plurality of views,
wherein each of the plurality of views includes a timestamp with a value or a frame number.

8. The apparatus of claim 1,
wherein the plurality of views is generated by the plurality of render nodes at a back end server performing rendering in parallel based on a plurality of primitives generated by an application that is executed by a master node.

9. The apparatus of claim 8,
wherein there is a one-to-one relationship between the plurality of encoders and the plurality of decoders,
wherein each of the plurality of encoded sequences of video frames generated by a corresponding encoder corresponds to one of the plurality of views of the VR environment.

10. A method, comprising:
receiving at a plurality of decoders of a client device a plurality of encoded sequences of video frames from a plurality of encoders of a plurality of render nodes located at a cloud gaming system;
generating at the plurality of decoders a plurality of views of a three dimensional representation of a virtual reality (VR) environment corresponding to a location in the VR environment by decoding the plurality of encoded sequences of video frames; and generating at a cube map viewer a point-of-view into the VR environment based on the plurality of views, wherein each of the plurality of encoders streams a corresponding sequence of video frames of a corresponding view to a corresponding decoder of the plurality of decoders, wherein a plurality of dedicated communication paths support communication between a plurality of pairs of encoders and decoders, such that each of the plurality of pairs of encoders and decoders is supported by a corresponding and dedicated communication path.

11. The method of claim 10, wherein the generating the plurality of views includes:

selecting one or more corresponding sequences of frames that are decoded of one or more of the plurality of views to generate the point-of-view into the VR environment.

12. The method of claim 11, further comprising:

blending one or more of the corresponding sequences of frames that are decoded to generate the point-of-view into the VR environment.

13. The method of claim 10, wherein the plurality of views corresponds to a plurality of sides of a grid map of the VR environment.

14. The method of claim 10, further comprising:

storing the plurality of views in one or more buffers, wherein each of the plurality of views includes a timestamp with a value or a frame number.

15. The method of claim 10, wherein the plurality of views is generated by the plurality of render nodes at a back-end server performing rendering in parallel based on a plurality of primitives generated by an application that is executed by a master node.

16. A non-transitory computer-readable medium storing a computer program for performing a method, the computer-readable medium comprising:

program instructions for receiving at a plurality of decoders of a client device a plurality of encoded sequences of video frames from a plurality of encoders of a plurality of render nodes located at a cloud gaming system;

program instructions for generating at the plurality of decoders a plurality of views of a three dimensional representation of a virtual reality (VR) environment corresponding to a location in the VR environment by decoding the plurality of encoded sequences of video frames; and program instructions for generating at a cube map viewer a point-of-view into the VR environment based on the plurality of views, wherein each of the plurality of encoders streams a corresponding sequence of video frames of a corresponding view to a corresponding decoder of the plurality of decoders, wherein a plurality of dedicated communication paths support communication between a plurality of pairs of encoders and decoders, such that each of the plurality of pairs of encoders and decoders is supported by a corresponding and dedicated communication path.

17. The non-transitory computer-readable medium of claim 16, wherein the program instructions for generating the plurality of views includes:

program instructions for selecting one or more corresponding sequences of frames that are decoded of one or more of the plurality of views to generate the point-of-view into the VR environment.

18. The non-transitory computer-readable medium of claim 17, further comprising:

program instructions for blending the one or more of the corresponding sequences of frames that are decoded to generate the point-of-view into the VR environment.

19. The non-transitory computer-readable medium of claim 16, wherein in the method the plurality of views corresponds to a plurality of sides of a grid map of the VR environment.

20. The non-transitory computer-readable medium of claim 16, wherein in the method the plurality of views is generated by the plurality of render nodes at a back-end server performing rendering in parallel based on a plurality of primitives generated by an application that is executed by a master node.

* * * * *